(12) United States Patent
Yamakado et al.

(10) Patent No.: US 7,308,650 B2
(45) Date of Patent: Dec. 11, 2007

(54) IMAGE LAYOUT DEVICE

(75) Inventors: Hitoshi Yamakado, Hino (JP); Yu Gu, Tama (JP); Toru Miyamoto, Hachiohji (JP)

(73) Assignee: Seiko Epson Corporation, Tokyo (JP)

( * ) Notice: Subject to any disclaimer, the term of this patent is extended or adjusted under 35 U.S.C. 154(b) by 652 days.

(21) Appl. No.: 10/924,812

(22) Filed: Aug. 25, 2004

(65) Prior Publication Data

US 2005/0091599 A1  Apr. 28, 2005

(30) Foreign Application Priority Data

Aug. 29, 2003  (JP) ............................ 2003-306810
Jan. 29, 2004  (JP) ............................ 2004-022294
Feb. 5, 2004  (JP) ............................ 2004-029496
Jun. 11, 2004  (JP) ............................ 2004-173948

(51) Int. Cl.
    *G06N 3/00*  (2006.01)
(52) U.S. Cl. ..................................... 715/517
(58) Field of Classification Search ................ 715/513, 715/517, 523, 530
    See application file for complete search history.

(56) References Cited

U.S. PATENT DOCUMENTS 6,636,650 B1  10/2003  Long et al.

FOREIGN PATENT DOCUMENTS

| JP | A 11-250272 | 9/1999 |
| JP | A 2000-138814 | 5/2000 |
| JP | A 2000-156777 | 6/2000 |
| JP | A 2000-295459 | 10/2000 |
| JP | A 2001-036732 | 2/2001 |
| JP | A 2002-158861 | 5/2002 |
| JP | A 2002-288669 | 10/2002 |

OTHER PUBLICATIONS

Masahide, Hirabayashi; *Software Technology 18: Latest Programming Dictionary using Language C* vol. 3; Jul. 25, 1995 first first edition; pp. 154-159.

*Primary Examiner*—Stephen Hong
*Assistant Examiner*—Kyle R Stork
(74) *Attorney, Agent, or Firm*—Oliff & Berridge, PLC

(57) ABSTRACT

Aspects of the invention can relate to an image layout device and an image layout method. The image layout device of the invention can be a device that automatically arranges a plurality of images within a particular area, and can include a layout angle determining device that determines the layout angle for each of the images based on an angle that is an integer multiple of a golden angle, and a layout position determining device that determines the layout position for each of the images depending on the overlap between each of the images due to the angle determined by the layout angle determining device.

39 Claims, 16 Drawing Sheets

IMAGE LAYOUT DEVICE

RELATED APPLICATIONS

The present application is based on and claims priority to Japanese patent application Nos. 2003-306810, 2004-022294, and 2004-029496, and 2004-173948 filed in Japan, the content of which is incorporated herein by reference in its entirety.

BACKGROUND OF THE INVENTION

1. Field of Invention

Aspects of the invention can relate to an advantageous image layout device and method used when automatically determining the layout of a plurality of images to a predetermined region.

2. Description of Related Art

The use of electronics in photography is steadily progressing due to the spread of digital cameras and camera equipped cell phones. Thus, in photograph albums, the tedious work of attaching photographs developed on conventional photographic paper to albums made of paper has become undesirable. That is, many users lay out electronic pictures in an electronic photograph album that is realized by using, for example, a computer and software. Furthermore, when publishing the photographs on the Internet, and as necessary, using a high quality output device, such as a color printer, an electronic photograph album is used. It is believed that from now the demand or electronic photograph albums will gradually increase.

However, whether the photograph album is paper or electronic, the user himself considers the layout positions of the images until a satisfactory layout is obtained, and positions the image manually or carries out layout commands.

As can be seen in the Photoshop Album (an application software produced by Adobe Systems Incorporated; a registered trademark in the United States and other countries), an electronic photograph album is produced by using a template in which the layout and background of the photographs are determined in advance. In this case, in this method, when the layout of the template is unsatisfactory, the only other option is to choose another template.

In addition, in other examples, the location of each image is calculated, then the net force exerted on individual images due to all the images is calculated, this interpreted as the distance and direction, and the positioning of the image is carried out. In the technology of this related example, the new position of individual images is calculated by simulating the electrostatic action that can be imagined to be present if there were an electrostatic point charge at the center of each of the individual images. This calculation is repeatedly carried out, and a layout that is aesthetically satisfactory can be obtained at each converging steps.

However, in the case of this related technology, although the layout of the images is determined automatically, complicated calculation processing is required. Thus, there are the problems that the processing requires time and a high capacity computer is necessary.

In addition, in the case of other related examples, although layout of the images is determined automatically, there can be no guarantee that the layout obtained as a result thereof will one that is satisfying to the user.

SUMMARY OF THE INVENTION

An object of the invention to provide an image layout device and method that, by using a simple calculation processing and at a high efficiency, can automatically lay out a plurality of electronic images such as electronic photographs in a predetermined area.

The invention can be a device that automatically lays out a plurality of images within a particular area, and includes a layout angle determining device that determines the layout angle for each of the images based on an angle that is an integer multiple of a golden angle and a layout position determining device that determines the layout position for each of the images depending on the overlap between each of the images due to the angle determined by the layout angle determining device. Here, a golden angle is an angle in which the 360° circumference is divided by a golden ratio of $1:(1+\sqrt{5}/2$, and found by $360°/(1+(1+\sqrt{5})/2)=137.507764$. The golden ratio is known as the one that expresses the aspect ratio of the most balanced and beautiful rectangle. The golden angle is known, for example, to make small the overlap of leaves by leaves sprouting from the branch according to the golden angle in the arrangement of leaves, and makes possible the optimal distribution of sun light and rain. The invention determines the layout angle for each of the images based on an angle that is an integer multiple of a golden angle and determines the layout position for each of the images depending on the overlap between each of the images due to this determined angle. Therefore, it is possible to determine the layout position for each of the images by using a simple computing process. Furthermore, it is possible to obtain an efficient layout because the overlap between each of the images is small.

The invention can be a device that automatically lays out a plurality of images within a particular area, and includes a layout angle center position determining device that determines the center position of a layout angle at an arbitrary position within the area, a layout angle determining device that determines the layout angle for each of the images based on an angle that is an integer multiple of a golden angle, where the layout angle center position determined by the layout angle center position determining device serves as a reference, and a layout position determining device that determines the layout position for each of the images depending on the overlap between each of the images due to the angle determined by the layout angle determining device. Thereby, the center position of the layout angle can be arbitrarily set by the layout angle center position determining device, the layout angle for each of the angles can be set based on an angle that is an integer multiple of a golden angle that serves as a reference therefore, and the layout position for each of the images is determined according to the overlap with other images by the layout position determining device. Therefore, based on a predetermined layout angle, it is possible to determine a position for each of the images simply by laying out the new image is sequence such that the overlap with the arranged images is made small or eliminated, and it is possible to determine the layout position for each of the images efficiently by using simple calculation processing.

Specifically, the present invention determines the center position of the layout angle at an arbitrary position within an area, determines the layout angle for each of the images based on an angle that is an integer multiple of a golden angle, where this layout angle center position serves as a reference, and sets the layout position for each of the images based on the overlap between each of the images due to this determined angle. Therefore, it is possible to determine the layout position for each of the images by using a simple calculation processing. Furthermore, the present invention can obtain an efficient image layout because the overlap between each of the images can be made small easily.

The invention can be a device that automatically lays out a plurality of electronic images within a predetermined area, and includes a layout angle determining device that determines the layout angle for each of the images based on an angle that is an integer multiple of a golden angle; a layout position determining device that determines the layout position for each of the images according to the overlap between each of the images due to the angle determined by the layout angle determining device; and a layout angle revising device that revises the value of the integer of the predetermined angel that the layout angle determining device uses as a reference in the case that there are images whose layout position within a particular area could not be determined by the layout position determining device. Thus, the invention determines the layout angle for each of the images based on an angle that is an integer multiple of a golden angle, and determines the layout position for each of the images depending on the overlap between each of the images due to this determined angle. Therefore, it is possible to determine the layout position of each of the images by using a simple calculation processing. In addition, because the layout angle revising device revises the value of the integer multiple of the golden angle that the layout angle determining device uses as a reference in the case that there are images whose layout position within a particular area could not be determined, it is possible to make the number of images that can be laid out in the particular area large. In addition, because the overlap between each of the images can be easily made small, it is possible to obtain an efficient layout. Furthermore, it is possible to generate various layout pattern even for the same number of images.

The invention can be a device that automatically lays out a plurality of electronic images within a particular area, and includes a layout angle determining device that sets the center position that serves as a reference for the layout angle and determines the angle of the layout position for each of the images based on an angle that is an integer multiple of a golden angle, a layout reference area determining device that determines a layout reference area in which images can be laid out within a particular area, a layout position determining device that determines the layout position for each of the images depending on the overlap between each of the images due to the angle determined in the layout angle determining device and the layout reference area determined by the layout reference area determining device, and a layout angle revising device that revises the value of the integer multiple of the golden angle that the layout angle determining device uses as a reference in the case that there are images whose layout position could not be determined by the layout position determining device. Thereby, the present invention can determine the position of each of the images simply by laying out new images in sequence such that the overlap between already laid out images is made small or eliminated; and it is possible to determine efficiently the layout position for each of the images by using simple computation processes. Therefore, according to the present invention, it is possible to determine the layout position for each of the images by using a simple computation processing and furthermore make the overlap between each of the images small, and thus it is possible to obtain an efficient layout.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

First Exemplary Embodiment

Below, a first embodiment of the invention will be explained with reference to the figures.

Figure 1:
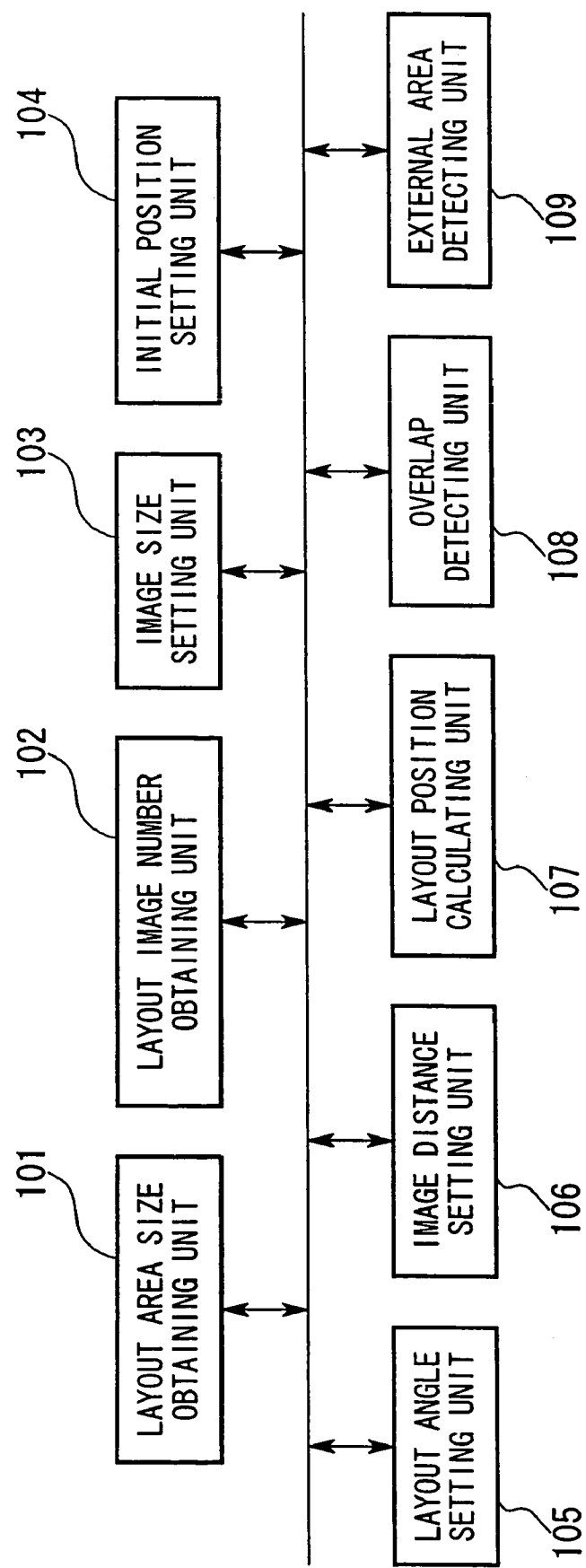
FIG. 1 is a block diagram showing an example of the structure of the image layout device of the invention.
Figure 2:
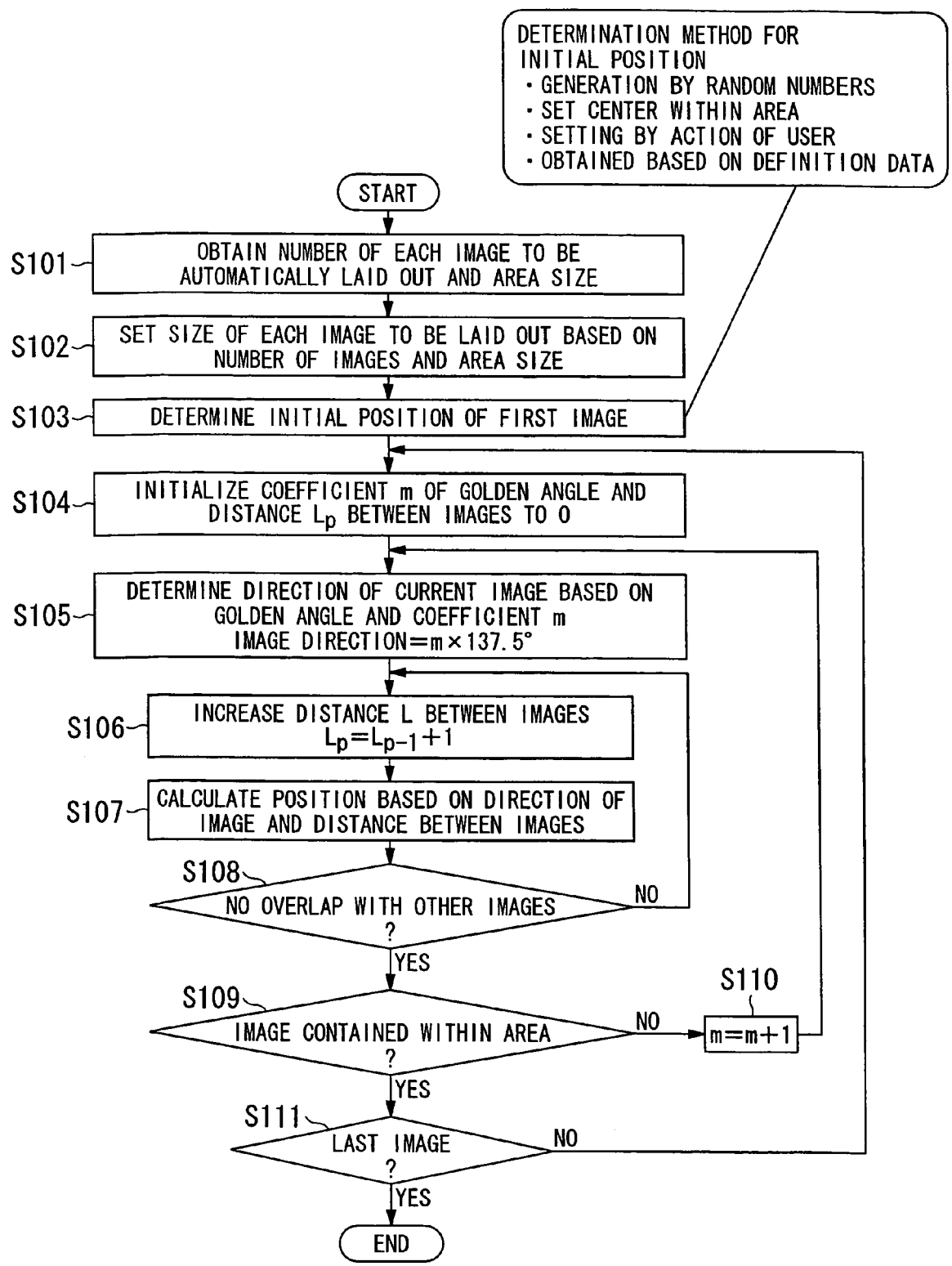
FIG. 2 is a flowchart showing an example of the operation of the structure in FIG. 1.

FIG. 1 is a block diagram for explaining the structure of the image layout device of the present invention. FIG. 2 is a flowchart for explaining an example of the operation thereof. The image layout device of the present embodiment is structured by a general use computer that provides a central processing unit, a memory device, keyboard, mouse, display device, a memory device that uses a optical recording medium or the like; peripheral devices such as a printer, digital camera and the like; and a program for image layout processing that is executed on a predetermined system software by a computer. FIG. 1 shows each of the functions of the image layout processing program divided into blocks.

In FIG. 1 and FIG. 2, an image layout device (image layout program) that is started up due to an operation by the user (operator) obtains the area size in which the images will be laid out, these images being indicated by the user by using a graphical user interface or the like between the user and the image layout device by using a layout area size obtaining unit 101. In addition, similarly, the layout image number obtaining unit 102 obtains the number of images indicated by the user that are to be automatically laid out (step S 101 in FIG. 2).

The image size setting unit 103 sets the size (width and height) of the images when laying out each of the images based on the obtained number of images and the area size (step S 102). The initial position setting unit 104 sets the initial position (X0, Y0) of the images to be laid out first (step S 103). For the determination method for the initial position, generation by random numbers, setting at the center of the area, setting by a user action, or predefined definition data can be considered for obtaining the initial position. In addition, when the image is laid out with respect to an initial position, it is necessary to consider the case in which the center of the image is aligned with the initial position, the case in which the center of gravity of the image is aligned with the initial position, and the case in which the center of a circumscribed rectangle of the image is aligned with the initial position.

The layout angle setting unit 105 initializes a coefficient m (where m is an integer equal to or greater than zero) of the golden angle and the distance $L_p$ between the images to 0 (step S 104). The golden angle denotes the angle at which the circumference 360° is divided by 1:$(1+\sqrt{5})/2$, and is found to be 360°/$(1+(1+\sqrt{5})/2)$=137.507764. This golden ratio is known to express the aesthetically pleasing rectangular aspect ratio having the greatest balance. The golden angle is known, for example, in the arrangement of the leaves, where the overlap between leaves is made small due to leaves sprouting from branches at the golden angle, making it possible to optimally distribute the sunlight and rain therebetween. In the present embodiment, the layout angle for each image is determined based on an angle that is m times (an integer multiple) the golden angle, and the layout position for each of the images is determined depending on the overlap between each of the images using this determined angle. The layout angle setting unit 105 determines the direction θ (layout angle θ) at which the image currently being laid out should be laid out based on the golden angle and the coefficient m by using the calculation θ=m×golden angle (step S 105).

Note that in the present embodiment, as a concrete value for the golden angle, the range of values from 130° to 144° is used. However, the most preferable example of the value of the golden angle is approximately 137.5°, which is calculated based on the Fibonacci number series.

The image distance setting unit 106 sets the distance $L_p$ between images at a predetermined distance (step S 106). For example, as shown in FIG. 2, the distance is simply increased by 1 pixel each time, where 1 pixel serves as the unit, such that $L_p=L_{p-1}+1$. Here, $L_{p-1}$ denotes the value of the distance $L_p$ between images used the previous time when determining the overlap of images while gradually increasing the distance $L_p$ between images each time by a predetermined amount.

The image position calculating unit 107 calculates the layout positions for each of the images from the initial position (X0, Y0), which is found by the initial position setting unit 104, and the direction θ of the images to be laid out and the distance $L_p$ between images, which are found respectively by the layout angle setting unit 105 and the image distance setting unit 106 (step S 107). In the image position calculating unit 107, a new image position (X, Y) can be calculated based on the following formulae:

$X=L_p \times \cos \theta + X0$ $Y=L_p \times \cos \theta + Y0$

The overlap detecting unit 108 compares the image position (X, Y) found by the image position calculating unit 107 and the position of the other images calculated up to this point in time, and determines whether or not any of the images overlap (step S 108). In the case that the overlap detecting unit 108 determines that images overlap, the calculation of a new distance between the images is calculated again by the image distance setting unit 106 (in step S 108, NO from step S 106).

At the same time, the external area detecting unit 109 determines whether or not an image is protruding from the area that was first obtained when an image is laid out at the new image position (X, Y) that has been calculated by the image position calculating unit 107 (step S 109). When the external area detecting unit 109 determined that the image is protruding, even when the overlap detecting unit 108 has determined that the image does not overlap another image, the calculations that have been done by the layout angle setting unit 105, image distance setting unit 106, and the image position calculating unit 107 are carried out again (step S 105 via step S 110 from NO in step S 109). For example, the coefficient m of the golden angle is increased by 1 by the layout angle setting unit 105 (step S 110), and a similar calculation is carried out by the image distance setting unit 106 and the image position calculating unit 107 for the new golden angle (steps S 105 to S 107).

In the case that the overlap detecting unit 108 has determined that there is no overlap and that the external area detecting unit 109 has determined that the image does not protrude outside the area, the layout position of the image is set. The initial position setting unit 104 and the like confirm whether there is an image whose layout position is to be calculated, and the layout calculations continue if any unprocessed images remain (step S 104 from NO in step S 111). In contrast, the processing ends when the layout of all the images has been determined (YES in step S 111).

In the manner described above, in the present embodiment, the layout rules for images are determined depending on a rule known to regulate a regular aesthetic satisfaction that appears in nature. Furthermore, the layout of each of the images can be determined based on the position of images previously disposed when each of the pictures is laid out in sequence. Therefore, the conventionally required complicated sequence of calculations for finding the net force between each of the images becomes unnecessary. In addition, the applied rule can easily recreate the natural beauty that humans have been accustomed to for ages. Thereby, when applied to electronic photograph albums as well, it becomes possible to recreate easily the aesthetically pleasant layout that people feel more naturally.

Note that in the operation of the image distance setting unit 106 explained with reference to FIG. 2, the distance $L_p$ between images was simply increased by 1 pixel unit each time so that $L_p=L_{p-1}+1$. However, the technique for increasing the distance between images is not limited thereby. It is possible to increase the distance, for example, by 5 pixels each time, using a plurality of pixels as the unit, or the value of the increase can be changed according to the Fibonacci number series.

The Fibonacci number series is a number series determined by the recursive formula $a_{n+2}=a_n+a_{n+1}$ from the initial values $a_0$ and $a_1$. For example, when $a_0=1$ and $a_1=1$, the Fibonacci number series becomes 1, 1, 2, 3, 5, 8, 13, 21, 34, 55, 89, . . . In addition, the ratio of the number (term) that the Fibonacci number series approaches is 1/1=1, 2/1=2, 3/2=1.5, 5/3=1.666 . . . , . . . , 89/55=1.61818 . . . , etc., and approaches the golden mean of 1:$(1+\sqrt{5})/2$.

The increase in the distance can be changed by a combination of Fibonacci numbers (for example, alternately using 21 and 34), or depending on a Fibonacci number series (for example, in the series 1, 1, 2, 3, 5, 8, 13, 21, 34, 55, 89, . . . ).

Figure 3:
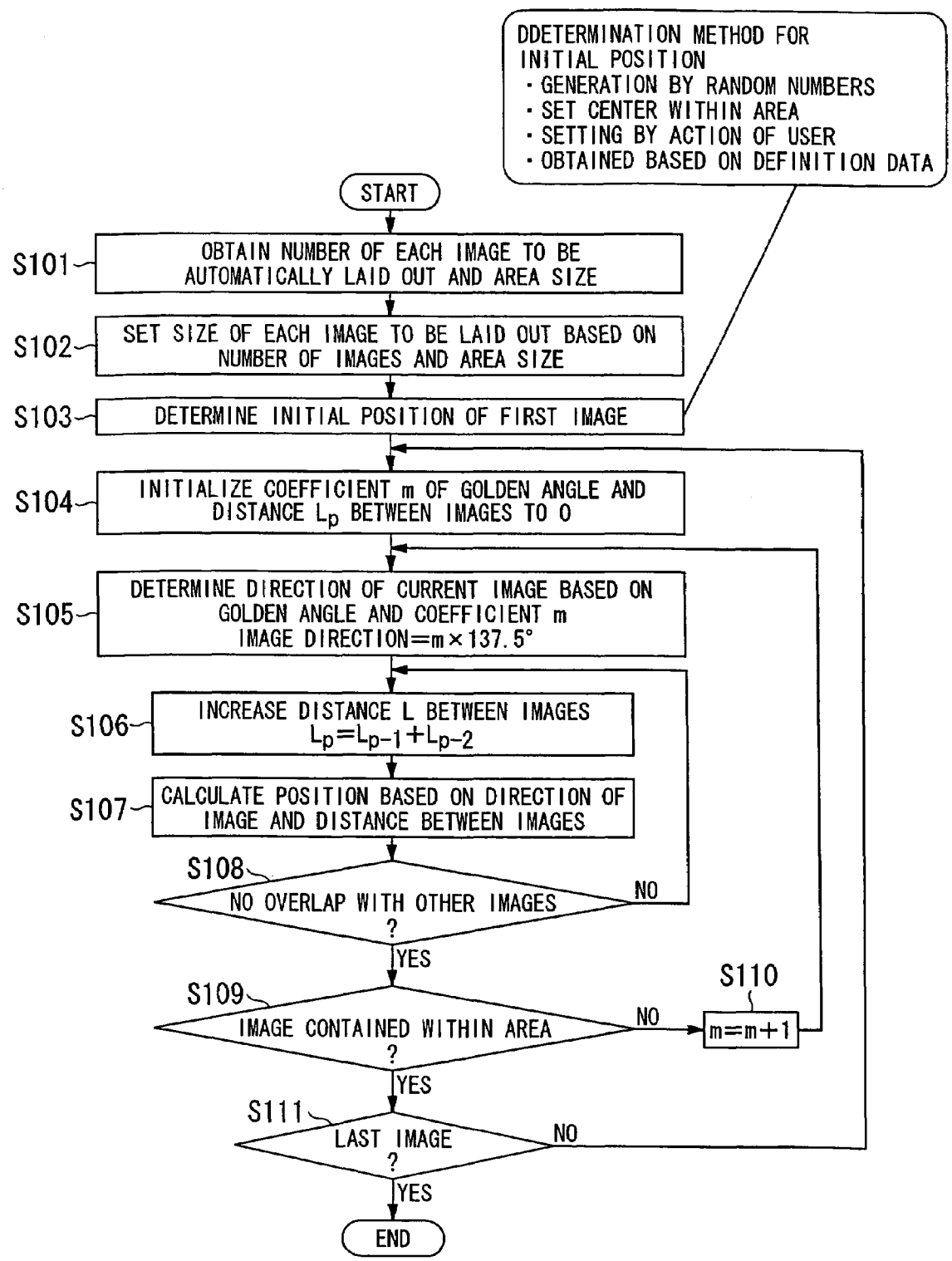
FIG. 3 is a flowchart showing another example of the operation of the structure in FIG. 1.

FIG. 3 shows a flowchart for the case in which the increase is changed depending on a Fibonacci number series. Comparing the flowchart shown in FIG. 3 and the flowchart shown in FIG. 2, the content of step S 106*a* in FIG. 3 and step S 106 in FIG. 2 are different. The other steps are identical. In the example shown in FIG. 3, the image distance setting unit 106 sets the distance $L_p$ between images according to a Fibonacci number series such that $L_p = L_{p-1} + L_{p-2}$. Here, $L_{p-1}$, and $L_{p-2}$ are the values of the distance 4 between images respectively used the first time and second time when determining the overlap of the images while gradually increasing the distance $L_p$ between images a predetermined amount each time.

Note that the embodiment of the present invention is not limited to the above, and for example, the following change is possible. For example, when determining the layout position while gradually increasing the distance from the initial position each time by the image distance setting unit 106, it is sufficient that the overlap with other images is eliminated and a position at which the distance between images is equal to or greater than a constant interval is determined as the layout for the images. Specifically, it is sufficient that the layout between images be determined so that there is a space having a predetermined interval.

In addition, in the overlap detecting unit 108, in addition to the determination in which the conditions are satisfied only the case that the overlap between each of the images is completely eliminated, it is also possible to have a determination in which conditions are also satisfied when they are within a range of a permissible overlap that has been set in advance. Specifically, it is possible to set the layout positions under the condition that overlap between any of the images has occurred if the overlap is within a predetermined amount for overlap set in advance.

In addition, in the examples described above, when determining the position of the nth image (where n is an integer equal to or greater than 2), in the case the layout position that satisfies the conditions related to the overlap with other images is obtained by increasing the distance from the initial position (X0, Y0) on the extension of the mth golden angle (where m is an integer equal to or greater than 0), when it is determined that the image protrudes from a particular area in step S 109, on the extension along the m+1 golden angle (where m is increased by only 1 in step S 110), the position of the image is found again after increasing the distance from the initial position (recalculate from step S 104). Here, for example, even when the image is accommodated within the area, in the case that overlap with another image would occur when the distance has been extended by an amount equal to or greater than a predetermined amount, that is, in the case that, even if the image is within the area, when the clearance between the image and the border of the area is small, this treated as equivalent to protruding from the region, which can be obtained as a result of the determination by step S 109. Or, when the position of the n+1 image is found, it is possible to determine the layout position starting from the extension of the m+1 golden angle, which corresponds to the next golden angle following the mth golden angle found for the position of the nth image (that is, the second time and after in step S 104, the coefficient m can be initialized to 0). Note that in the embodiment explained with reference to FIG. 2, when the position of the n+1 position is found, irrespective of the number of the golden angle that was used to find the position of the nth image, the layout position is determined first from the extension of the 0th golden angle. According to this process, it is possible to lay out many images concentrated in the direction of the extension of the 0th golden angle, and it is possible to lay them out in a unique formation.

In addition, according to the flowchart in FIG. 2, as a result of the calculation of the positions of all the images, in the case that the position of one or more images has not been determined (the case in which they could not be laid out), it is possible to offset the initial position (X0, Y0) by one pixel or a plurality of pixels, and recalculate the position.

Note that the embodiment of the present invention can be realized by a computer and a program that is executed on this computer, and this program can be delivered on the communication line or via a computer readable media. In addition, each of the parts shown in FIG. 1 can be further segmented or combined, and can be laid out after being distributed over a communication line.

Note that the present invention was explained based on the golden angle described above, but it can also be understand that the embodiment of the present invention may have the following characteristics. Specifically, the present invention may automatically determined the position of one or a plurality of images within a particular area, and may be understood to be characterized in determining the layout of the images by using a Fibonacci number series. Here, when using the Fibonacci number series, it may be understood that the present invention is characterized in determining the layout of the images by applying the Fibonacci number series to angles. Or, when using the Fibonacci number series, the present invention may be characterized in determining the position of images by applying the Fibonacci number series to a distance. Or, although not described in particular in the embodiment described above, when using a Fibonacci number series, it is also possible to determine the position of an image by applying the Fibonacci number series to the direction (slope) of the image. Or, when using a Fibonacci number series, the present invention can be characterized in determining the position of an image by applying an isometric spiral (a spiral in which the straight line that connects a vertex and an arbitrary point on the curve always has the same angle as the tangent to the curve on this point) in which a Fibonacci number series appears.

Here, when using the Fibonacci number series, it is possible to determine the position of an image based on the golden angle that appears in the arrangement of the leaves of a plant (at an angle of 130° to 144°, more preferably 137.5°). In addition, when determining the position of the nth image (where n is an integer equal to or greater than 2), the position of the nth image can be set on the line along the mth golden angle (where m is equal to or greater than 0) at the point in time that the overlap with other images is eliminated or the point in time that the images becomes separated by a distance that is equal to or greater than a certain interval while the increase in the distance is extended as Fibonacci numbers (one among 1, 1, 2, 3, 5, 8, 13, 21, 34, 55, 89, 144, 233, . . . , or a combination of several, for example, set alternating between 21 and 34). Or, when determining the position of the nth image, the position of the nth image can be set on the line along the mth golden angle at the point in time that the overlap with other images is eliminated or the point in time that the images are separated by a distance that is equal to or greater than a certain interval, where the increase in distance follows a Fibonacci number series while gradually offsetting the distance from the initial point.

In addition, it is possible to understand that is invention is characterized in that, in the case that the position of one or more images has not been determined as a result of calculating the positions of all the images, the position of the images is recalculated by offsetting the initial position by one pixel or a plurality of pixels. Furthermore, it can be understood that the present invention is characterized in that, in the case that the position of one or more images has not been determined even when recalculation has been carried out, after the initial position has been offset, the initial position is calculated after being offset again, and this calculation is repeated until the positions of all the images have been determined.

Figure 4:
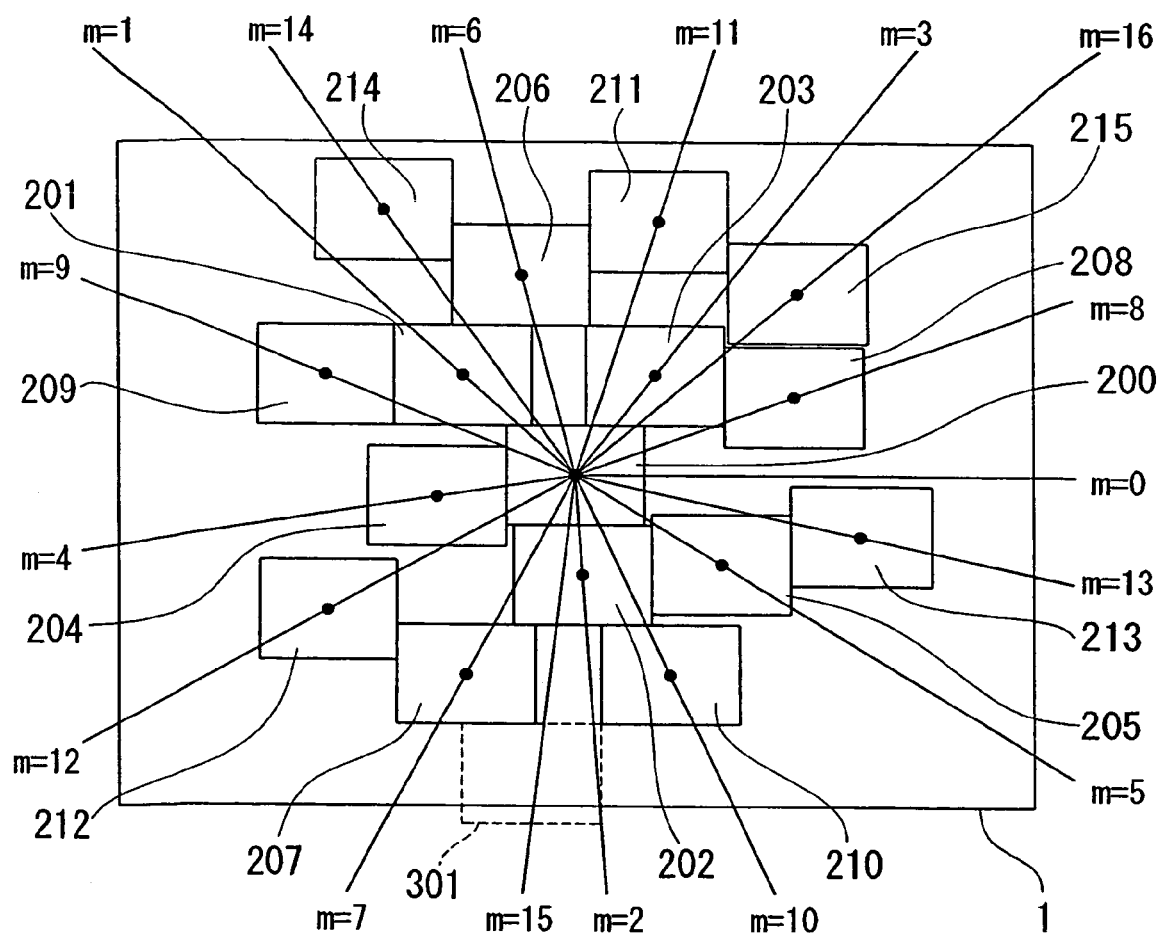
FIG. 4 is a drawing showing an example of image layout using the structure and flowchart in FIG. 1 and FIG. 2.

FIG. 4 shows an example of the layout of images using the image layout device of the embodiment of the present invention explained with reference to FIG. 1. However, this example is the case in which the coefficient m is not initialized in the processing after step S 104 is carried out the second time. That is, when finding the position of the n+1 image, the layout position is determined first from the extension of the m+1 golden angle, which corresponds to the golden angle following the mth golden angle that was used to find the position of the nth image. In FIG. 4, sixteen images 200 to 215 having identical shapes are laid out within a particular area 1. m=0 to m=16 are numerals denoting the coefficient of the golden angles, and each of the numerals is displayed in the vicinity of the thin line that shows the direction of the extension of the golden angle that has been multiplied by the coefficient m. In this example, the image 301 cannot be laid out on the extension of the golden angle having the coefficient multiple m=15, and the sixteenth image 215 is laid out in the extension of the golden angle having a coefficient multiple m=16.

As described above, in the image layout device of the present invention, the layout angle determining device (the layout angle setting unit 105) determines the layout angle for each of the images based on an angle between 130° and 144°, which includes the golden angle found by 360°/(1+(1+$\sqrt{5}$)/2), that serves as a golden angle, and is multiplied by an integer. Thus, when there is a low number of images, by approximating the golden angle using, for example, a rational number, it is possible to simplify the computation process further.

In addition, the image layout device of the present invention can determine the initial position, which is the layout position of the image among a plurality of images that is laid out first, depending on any of a position found using random numbers, the central position of the particular area described above, a position set depending on the operation by the user, or a position set based on definition data that has been set in advance. In the case of finding the initial position by using a random number, it is possible to automatically change the layout state of the images. In addition, in the case of using the center position of a particular area as the initial position, it is always possible to obtain a constant position for an image. Furthermore, in the case that the initial position is set depending on an operation of a user, it is possible that the intension of the user be reflected in the layout of the images. In addition, in the case that the initial position is set depending definition data set in advance, it is possible to set different layout states repeatedly and simply.

In addition, in the image layout device of the present invention, when determining the position of the nth image (where n is an integer equal to or greater than 2), the layout angle determining device determines the layout angle in the direction of an angle that is m times the golden angle, which is the mth golden angle (where m is an integer equal to or greater than 0). The layout position determining device (the image distance setting unit 106, the image position calculating device 107, and the overlap detecting unit 109) determines the position at which there is no overlap with other images to serve as the layout position of the nth image. At the same time, the layout position setting device offsets the distance from the initial position by a predetermined amount. As a result, it is possible to determine the new layout of the image without changing the layout state of the previous images based on the layout sequence. In addition, it is possible to determine the overlap between each of the images by repeating a simple process. Therefore, according to the present invention, it is possible to simplify the computation process for the image layout.

In addition, in the present invention, when determining the position of the nth image (where n is an integer equal to or greater than 2), the layout angle determining device determines the layout angle in the direction of the angle that is m times the golden angle, which is the mth golden angle (where m is an integer equal to or greater than 0). The layout position determining device determines the position at which there is no overlap with other images and the images are separated by a distance equal to or greater than a certain interval while the distance from the initial position is offset by a predetermined amount. This position serves as the layout position of the nth image. As a result, it is possible to determine the new layout of the image without changing the layout of the previous images based on the layout sequence. In addition, it is possible to determine the overlap between each of the images by repeating a simple process. Therefore, according to the present invention, it is possible to simplify the computation process for the image layout.

In addition, in the image layout device of the present invention, the predetermined amount when offsetting the distance is 1 pixel or a predetermined plurality of pixels, where the pixel serves as the unit. In this manner, because the distance between the images is offset using pixel units, it is possible to simplify the process for determining whether or not there is overlap between images.

In addition, in the image layout device of the present invention, the predetermined amount when offsetting the distance is determined by using two or more numbers of a Fibonacci number series.

In addition, in the present invention, the predetermined amount when offsetting the distance is determined so as to increase according to a Fibonacci number series.

The Fibonacci number series is a number series determined by the recursive formula $a_{n+2}=a_n+a_{n+1}$ from the initial values a0 and a1. For example, when $a_0=1$ and $a_1=1$, the Fibonacci number series becomes 1, 1, 2, 3, 5, 8, 13, 21, 34, 55, 89, . . .

In addition, the ratio of the number (term) that the Fibonacci number series approaches is 1/1=1, 2/1=2, 3/2=1.5, 5/3=1.666 . . . , . . . , 89/55=1.61818 . . . , etc., and approaches the golden mean of 1:(1+$\sqrt{5}$)/2.

As described above, the increase in the distance is increased according to a combination of Fibonacci numbers or a Fibonacci number series (that is, using the values of a sequence in order), and thus it is possible to eliminate overlapping with good efficiency.

In addition, in the image layout device of the present invention, the layout position determining device determines the layout position for each of the images such that the overlap between each of the images due to the angle determined by the layout angle determining unit is eliminated or falls within a range that permits an overlap set in advance. Thereby, for example, it is possible to permit a degree of overlap that does not cause problems in recognizing each of the images.

In addition, in the image layout device of the present invention, when determining the position of the nth image, the position of the image is determined by increasing the distance from the initial position on the extension along the m+1 golden angle in the case that the image protrudes from a particular area at the layout position at which the image overlaps other images after increasing the distance from the initial position on the extension of the mth golden angle. In addition, in the case that the overlap with other images occurs even after the distance is increased to equal to or greater than a predetermined amount, the position of the image is found by increasing the distance from the initial position again on the extension along the m+1 golden angle. As a result, even in the case that the image layout device of the present invention cannot lay out images in the direction of the mth golden angle, there are times when it is possible to respond to this situation by making the layout in a different direction. Thereby, it is possible to increase the number of images that can be laid out within the area.

In addition, in the image layout device of the present invention, when finding the position of the n+1 image, the layout position is determined first from the extension of the m+1 golden angle, which corresponds to the golden angle following the mth golden angle, which was used to find the position of the nth image. According to this process, the image layout device of the present invention can be expected to obtain the most efficient layout.

In addition, in the image layout device of the present invention, when finding the position of the n+1 image, irrespective of the number of the golden angle that was used to find the position of the nth image, the layout position is determined first from the extension of the 0th golden angle. According to this process, it is possible to lay out many images concentrated in the direction of the extension of the 0th golden angle, and it is possible to lay them out in a unique formation.

In addition, in the image layout device of the present invention, as a result of calculating the positions of all the images, in the case that the positions of one or more images has not been determined, the initial position is offset by one pixel or a plurality of pixels and recalculated. Thereby, the image layout device of the present invention can be expected to lay out many more images.

Another exemplary embodiment of the invention is a method in which a plurality of electronic images are laid out within a particular area, and is characterized in providing a layout angle determination process in which the layout angle for each of the images is determined based on an angle that is an integer multiple of the golden angle and a layout position determining process in which the layout position for each of the images is determined depending on the overlap between each of the images due to the angle determined by the layout angle determining process. In addition, another embodiment of the invention is a program for automatically laying out a plurality of electronic images within a particular area, and includes a description for execution using a computer of a layout angle determining process that determines the layout angle for each of the images based on an angle that is an integer multiple of the golden angle and a layout position determination process that determines the layout position for each of the images depending on the overlap of each of the images due to the angle determined by the layout angle determination process.

Second Exemplary Embodiment

Below, a second embodiment of the invention will be explained with reference to the drawings.

Figure 5:
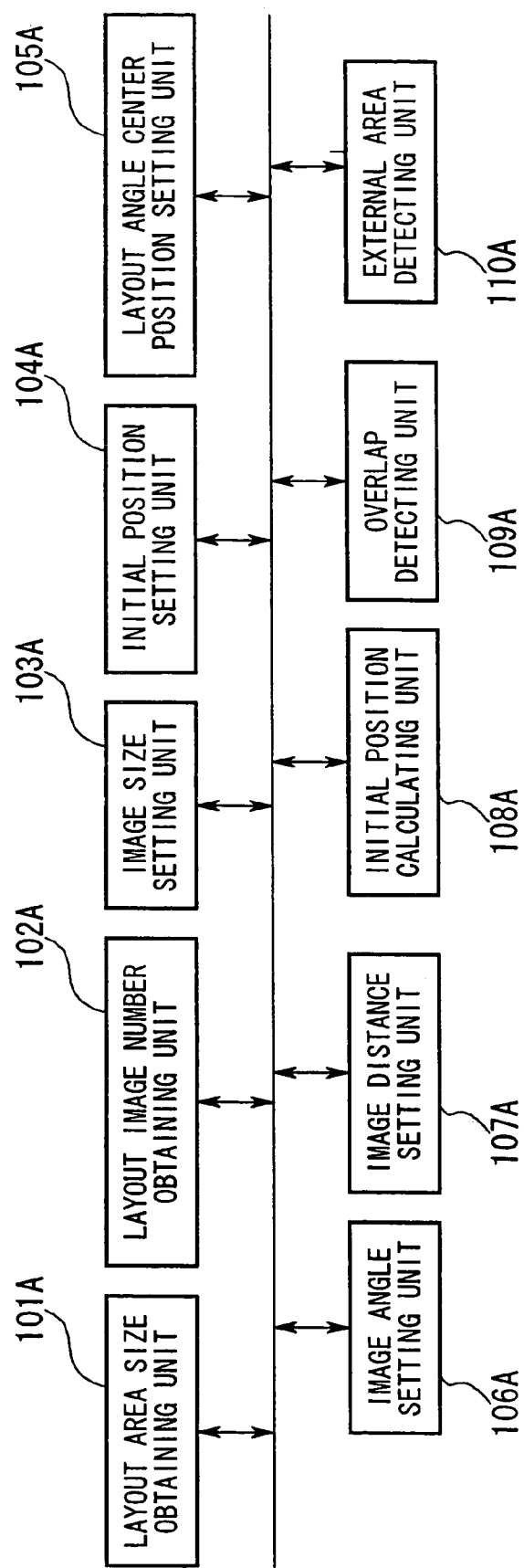
FIG. 5 is a block diagram showing an example of the structure of the image layout device of the invention.
Figure 6:
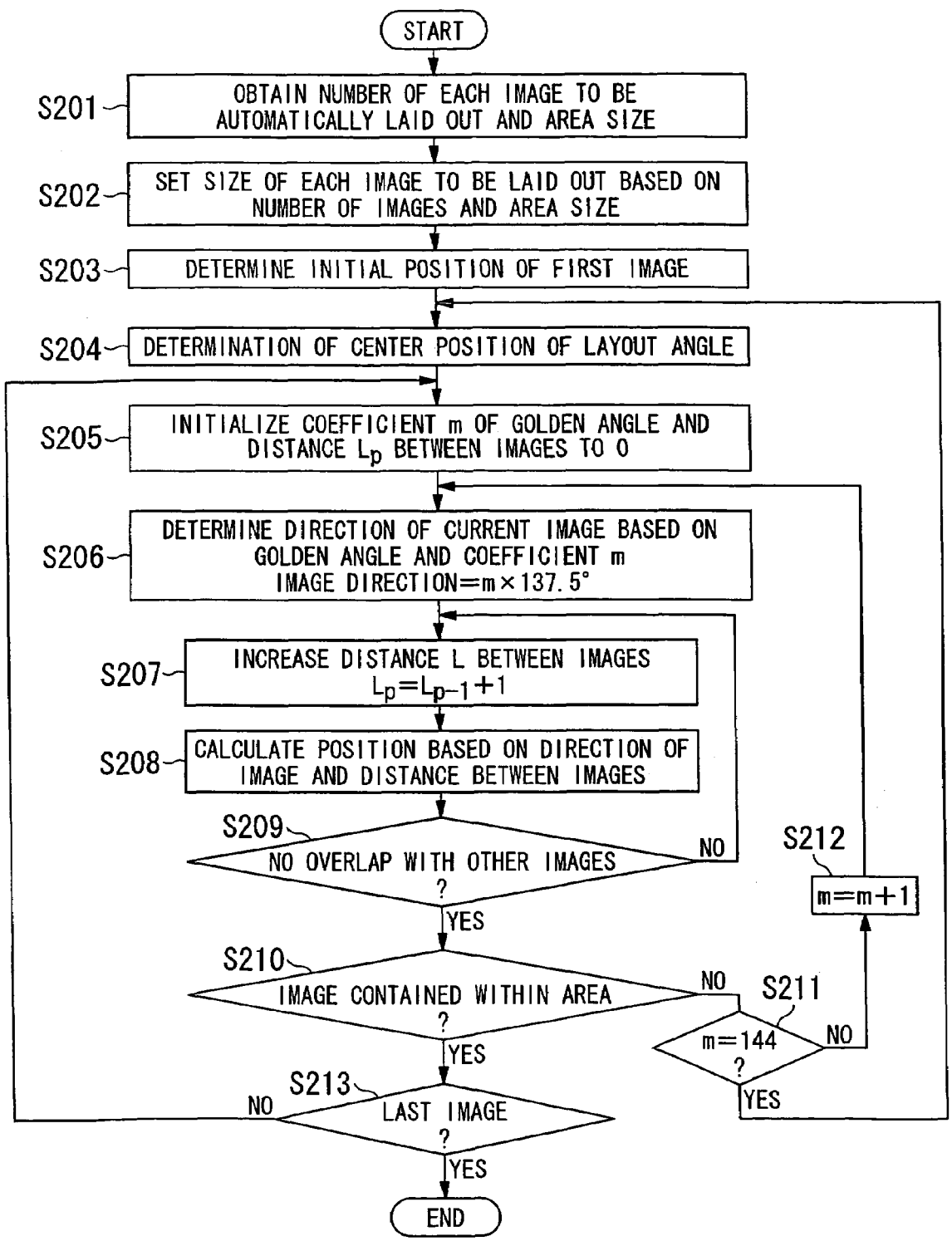
FIG. 6 is a flowchart showing an example of the operation of the structure in FIG. 5.

FIG. 5 is a block diagram for explaining the structure of the image layout device of the present invention. FIG. 6 is a flowchart for explaining an example of the operation thereof. The image layout device of the present embodiment is structured by a general use computer that provides a central processing unit, a memory device, keyboard, mouse, display device, a memory device that uses a optical recording medium or the like; peripheral devices such as a printer, digital camera and the like; and a program for image layout processing that is executed on predetermined system software by a computer. FIG. 5 shows each of the functions of the image layout processing program divided into blocks.

In FIG. 5 and FIG. 6, an image layout device (image layout program) that is started up due to an operation by the user (operator) obtains an area size for laying out the images that the user has indicated by using a graphical user interface or the like between the user and the image layout device by a layout area size obtaining unit 101A. In addition, similarly, the layout image number obtaining unit 102A obtains the number of images that have been indicated by the user to be automatically laid out (step S 201 in FIG. 6).

Figure 7A:
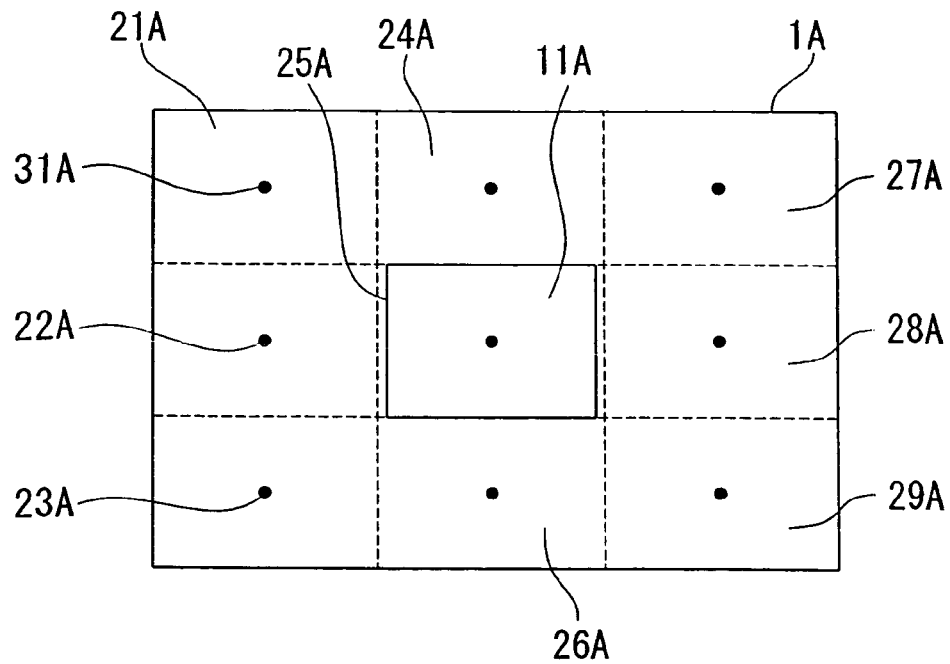
FIG. 7A, 7B is a drawing showing an example of the image layout using the structure and flowchart in FIG. 5 and FIG. 6.

The image size setting unit 103A sets the size (width and height) when laying out each of the images based on the obtained number of images and area size (step S 202). The initial position setting unit 104A sets the initial position (X0, Y0) of the image to be laid out first (step S 203). For the determination method for the initial position, generation by random numbers, setting at the center of the area, setting by a user action, or predefined definition data can be considered for obtaining the initial position. In addition, when the image is laid out with respect to an initial position, it is necessary to consider the case in which the center of the image is aligned with the initial position, the case in which the center of gravity of the image is aligned with the initial position, and the case in which the center of a circumscribed rectangle of the image is aligned with the initial position. FIG. 7A shows an example of the layout of image 11A is laid out initially in the layout area 1A. In this case, the image 11A is laid out so that the center of the image is aligned with the center of the layout area 1A.

The layout angle center position unit 105A determines the center position of the layout angle at a predetermined position (step S 204). The method of determination of the center of the layout angle can set the position angle center point at an arbitrary point inside or outside the layout area irrespective of the initial position of the image that is to be laid out first. A method can be considered in which, for example, the layout area can be segmented two or three times on the abscissa and ordinate into a lattice form, and any of the center points (lattice points) of the four or nine rectangles formed at this time can be selected automatically or depending on a user operation to serve as the layout angle center point. In the example shown in FIG. 7A, in the case that the layout area is segmented into nine lattice shaped regions 21A to 29A shown by dividing the layout area 1 by the broken lines, among the nine lattice points which are the center points of each of the lattice areas, it is possible to select the lattice point 31A of the area 21A as the layout angle center point. In addition, in the case that an arbitrary point outside the layout area serves as the layout angle center point, it is possible to make the distance between the layout angle center point and each of the laid out images comparatively large, and thereby in comparison to the case in which the layout angle center point is set inside the area, it is possible to obtain a layout relationship having differing slopes.

The layout angle setting unit 106 initializes coefficient m (where m is an integer equal to or greater than zero) of the golden angle and the distance $L_p$ between images to 0 (step S 205). The golden angle denotes the angle in which the circumference 360° is divided by $1:(1+\sqrt{5})/2$, and is found to be $360°/(1+(1+\sqrt{5})/2)=137.507764$. This golden ratio is known to express the aesthetically pleasing rectangular aspect ratio having the greatest balance. The golden angle is known, for example, in the arrangement of the leaves, where the overlap between leaves is made small by leaves sprouting from branches at the golden angle, making it possible to optimally distribute the sunlight and rain. In the present exe exemplary embodiment, the layout angle for each image is determined based on an angle that is m times (an integer multiple) the golden angle, and the layout position for each of the images is determined depending on the overlap between each of the images using this determined angle. The layout angle setting unit 106 determines the direction θ (layout angle θ) at which the image currently being laid out should be laid out based on the golden angle and the coefficient m by using the calculation θ=m×golden angle (step S 206).

Note that in the present embodiment, as a concrete value for the golden angle, the range of values from 130° to 144° is used. However, the most preferable example of the value of the golden angle is approximately 137.5°, which is calculated based on the Fibonacci number series. In this example, 137.5° will be used as the set value of the golden angle.

The image distance setting unit 107A sets the distance $L_p$ between images at a predetermined distance (step S 207). For example, the distance can be simply increased by 1 pixel, where 1 pixel serves as the unit, each time such that $L_p=L_{p-1}+1$. Here, $L_{p-1}$ denotes the value of the distance $L_p$ between images used the previous time when determining the overlap of images while gradually increasing the distance $L_p$ between images each time by a predetermined amount.

The image position calculating unit 108A calculates the layout position for each of the images from the initial position (X0, Y0), which is found by the initial position setting unit 104A, and the direction θ of images to be laid out and the distance $L_p$ between images (step S 208), which are found respectively by the layout angle setting unit 106A and the image distance setting unit 107A In the image position calculating unit 108A, a new image position (X, Y) can be calculated based on the following formulae:

$X=L_p \times \cos θ + X0$ $Y=L_p \times \cos θ + Y0$

The overlap detecting unit 109A compares the image position (X, Y) found by the image position calculating unit 108A and the position of the other image calculated up to this point in time, and determines whether or not any of the images overlap (step S 209). In the case that the overlap detecting unit 109A determines that images overlap, the calculation of the new distance between the images is calculated again by the image distance setting unit 107A (in step S 209, NO from step S 207).

Next, the external area detecting unit 110A determines whether or not the image is protruding from inside the area that was first obtained when an image is laid out at the new image position (X, Y) that has been calculated by the image position calculating unit 108A (step S 210). When it has been determined by the external area detecting unit 110 that the image is protruding (NO in step S 210), the direction of the image is changed (that is, the coefficient m is changed) again by the layout angle setting unit 106A (step S 206), and whether or not the image can be laid out at another position is calculated (re-execution of the processes in step S 206 and after via step S 212). However, before carrying out this recalculation, it is determined whether or not it is possible to set the direction after the change in a direction for which an image position has not yet been calculated (step S 211).

For example, in the case that the set value of the golden angle is 137.5°, the layout angle θ when the direction has been changed 144 times becomes θ=m×137.5°=144×137.5°=360°×55, and this indicates that the case in which m=0 is equivalent to the layout angle θ=0°. That is, when m=144 or more, even if the coefficient m is changed, the calculation is repeated for directions identical to those whose calculation has already been completed. Thus, in step S 211, it is determined whether or not the coefficient m equals 144, and thereby it is determined whether or not there are still directions for which the image position has not been calculated. In addition, in the case that there are directions for which the image position has not been calculated, the layout angle θ is set in another direction, and the layout processing for the image is carried out.

Therefore, in the case that it has been determined by the external area detecting unit 110A that the image is protruding (NO in step S 210), when the coefficient m is less than 144 only (NO in step S 211), the coefficient m is increased by 1 (step S 212), and the calculations in step S 206 and after are carried out again by the layout angle setting unit 106A, the image distance setting unit 107A, the image position calculating unit 108A and the like (step S 206 from NO in step S 211 via step S 212). Here, the processing from step S 211 to S 212 is carried out in the block of the layout angle center position setting unit 105A, the external area detecting unit 110A, and the like shown in FIG. 5, or it is possible to carry out the processing by another functional block (not illustrated).

In contrast, in the case that the coefficient m is equal to 144 (YES in step S 211), the processing returns to step S 204, and after the layout angle center position setting unit 105A resets the layout angle center position to a value that differs from the one heretofore (for example, in the example in FIG. 7A, after resetting the layout angle center position to a lattice point (including the initial position) other than lattice point 31), the layout angle setting unit 106A, the image distance setting unit 107A, and the image position calculating unit 108A and the like carry out the recalculation. Specifically, in the case that the layout angle θ that is to be set next is equal to the layout angle θ previously set for the image, the layout processing for the image is carried out after the layout angle center position setting unit 105A changes the center position of the layout angle.

Note that in step S 211, it is determined whether or not there is an uncalculated direction by whether or not the coefficient m is equal to 144. However, in the case that the set value (approximate value) of the golden angle is set to a value other than 137.5°, the value that is the reference for this determination must be suitably changed depending on this set value.

On the other hand, in the case that the overlap detecting unit 109A has determined that there is no overlap and the external area detecting unit 110A has determined that the image does not protrude outside of the layout area, the layout position of the image is set. The initial position setting unit 104A confirms whether or not there are images whose layout position should be calculated, and if unprocessed images remain (step S 205 from NO in step S 213), the calculation of the layout continues. In contrast, in the case that the layout of all the images has been determined, the processing ends (YES in step S 213).

Figure 7B:
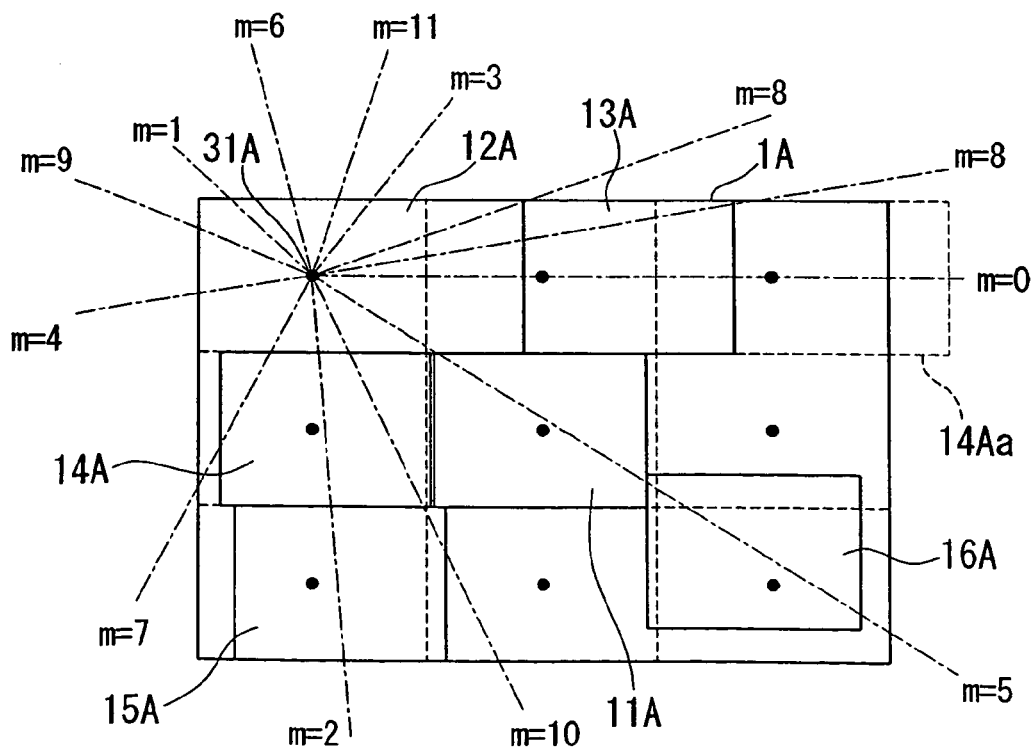

FIG. 7B shows an example of a layout of six images 11A to 16A. In this example, as shown in FIG. 7A, the layout angle center position is set at lattice point 31A, and the first image 11A is laid out at the center of the layout area 1A. Images 11A and 12A to 16A show images that have been respectively laid out first and second through sixth. m=0 to m=12 are reference numerals showing the coefficient of the golden angle, and each of the reference numerals is displayed in the vicinity of the broken line that shows the direction of the extension of the golden angle multiplied m times. In contrast, the fourth image 14A cannot be laid out in the direction of the golden angle having m=0 (because the position of the image 14Aa protrudes from the area 1), and thus the image is laid out in the direction of the golden angle having m=2. In addition, the fifth image 15A is laid out in the direction of m=2 and the sixth image 16A is laid out in the direction of m=5.

In the manner described above, in the present embodiment, the layout rules for images are determined depending on a rule known to regulate a regular aesthetic satisfaction that appears in nature. Furthermore, the layout of each of the images can be determined based on the position of images previously disposed when each of the images is laid out in sequence. Therefore, a conventionally required complicated sequence of calculations for finding the net force between each of the images becomes unnecessary. In addition, the applied rule can easily recreate the natural beauty that humans have been accustomed to for ages. Thereby, when applied to electronic photograph albums as well, it becomes possible to recreate easily the aesthetically pleasant layout that people feel more naturally.

Note that in the operation of the image distance setting unit 107A explained with reference to FIG. 6, the distance $L_p$ between images was simply increased by 1 pixel unit each time so that $L_p=L_{p-1}+1$. However, the technique for increasing the distance between images is not limited thereby. It is possible to increase the distance by 5 pixels each time, using a plurality of pixels as the unit, and the value of the increase can be changed according to a Fibonacci number series.

The Fibonacci number series is a number series determined by the recursive formula $a_{n+2}=a_n+a_{n+1}$ from the initial values a0 and a1. For example, when a0=1 and a1=1, the Fibonacci number series becomes 1, 1, 2, 3, 5, 8, 13, 21, 34, 55, 89, . . . In addition, the ratio of the number (term) that the Fibonacci number series approaches is 1/1=1, 2/1=2, 3/2=1.5, 5/3=1.666 . . . , . . . , 89/55=1.61818 . . . , etc., and approaches the golden mean of 1:(1+√5)/2. The increase in the distance can be changed by a combination of Fibonacci numbers (for example, alternately using 21 and 34), or depending on a Fibonacci number series (for example, in the series 1, 1, 2, 3, 5, 8, 13, 21, 34, 55, 89, . . . ).

Figure 8:
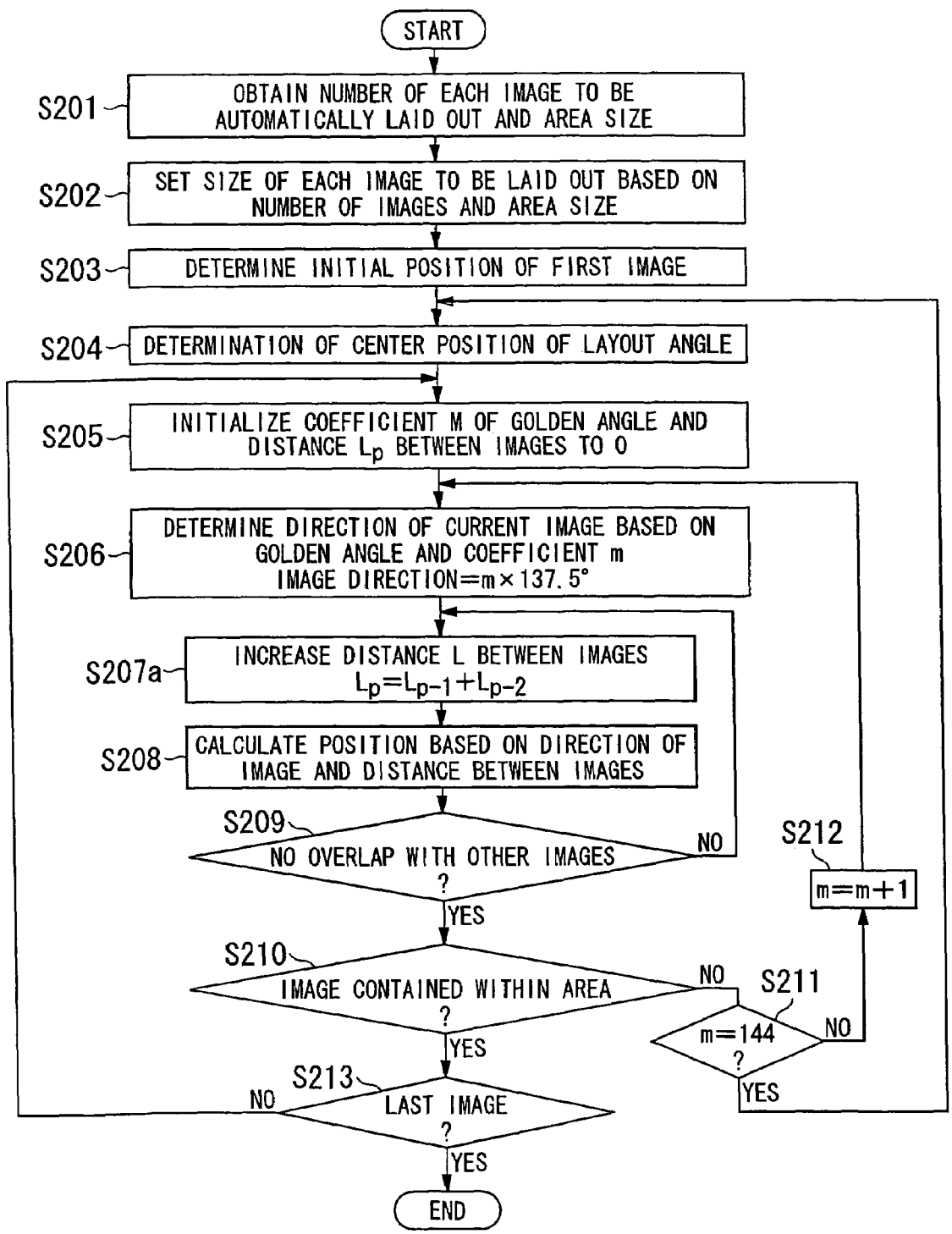
FIG. 8 is a flowchart showing another example of the operation of the structure shown in FIG. 5.

FIG. 8 shows a flowchart for the case in which the increase is changed depending on a Fibonacci number series. In the flowchart shown in FIG. 8, the content of step S 207a in FIG. 8 and step S 207 in FIG. 6 are differ from those in the flowchart shown in FIG. 6. The other steps are identical. In the example shown in FIG. 8, the image distance setting unit 107A sets the distance $L_p$ between images according to a Fibonacci number series such that $L_p=L_{p-1}+L_{p-2}$. Here, $L_{p-1}$ and $L_{p-2}$ are the values of the distance $L_p$ between images used the first time and second time respectively when determining the overlap of the images while gradually increasing the distance $L_p$ between images a predetermined amount each time.

Note that the embodiment of the present invention is not limited to the above, and for example, the following change is possible. For example, when determining the layout position while gradually the image distance setting unit 107A increases the distance from the initial position each time, it is sufficient that any overlap with other images is eliminated and a position at which the distance between images is equal to or greater than a constant interval is determined as the layout for the images. Specifically, it is sufficient that the layout between images be determined so that there is a space having a predetermined interval.

In addition, at the overlap detecting unit 109A, it is also possible that in addition to the determination in which the conditions are satisfied only the case in which the overlap between each of the images is completely eliminated, there can also be the determination in which conditions are satisfied also when the overlap is within a range providing a permissible overlap set in advance. Specifically, it is also possible to set the layout positions in a condition wherein overlap between each of the pictures occurs when within a predetermined amount for overlap set in advance.

In addition, in the examples described above, when determining the position of the nth image (where n is an integer equal to or greater than 2), in the case in which the layout position that satisfies the conditions related to overlap with another image is obtained by increasing the distance from the initial position (X0, Y0) on the extension of the mth golden angle (where m is an integer equal to or greater than 0), when it is determined that the image protrudes form a particular area in step S 210, on the extension along the m+1 golden angle (where m is increased by only 1 in step S 212), the position of the image is found again after increasing the distance from the initial position (recalculate from step S 205). In contrast, for example, even when the image is accommodated within the area, in the case that overlap with another image would occur when the distance has been extended by an amount equal to or greater than a predetermined amount, that is, in the case that, even if the image is within the area, when the clearance with the border of the area is small, a result is obtained in step S 210 which is equivalent to protruding from the layout region. Or, when the position of the n+1 image is found, it is possible to determine the layout position starting from the extension of the m+1 golden angle, which corresponds to the next golden angle after the mth golden angle found for the position of the nth image (that is, in step S 205 from the second time the coefficient m can be initialized to 0). Note that in the embodiment explained with reference to FIG. 6, when the position of the n+1 position is found, irrespective of the number of the golden angle that was used to find the position of the nth image, the layout position is determined first from the extension of the 0th golden angle. According to this process, it is possible to lay out many images concentrated in the direction of the extension of the 0th golden angle, and it is possible to lay them out in a unique formation.

In addition, according to the flowchart in FIG. 6, as a result of the calculation of the positions of all the images, in the case that the position of one or more images has not been determined (the case in which they could not be laid out), it is possible to offset the initial position (X0, Y0) by one pixel or a plurality of pixels, and recalculate the position.

Note that the embodiment of the present invention can be realized by a computer and a program that is executed on this computer, and this program can be delivered on a telecommunication line or via a computer readable medium. In addition, each of the parts shown in FIG. 5 can be further segmented or combined, and can be laid out after being distributed over a telecommunication line.

Note that the present invention was explained based on the golden angle described above, but it can also be understand that the embodiment of the present invention may have the following characteristics. Specifically, the present invention may automatically determined the position of one or a plurality of images within a particular area, and may be understood to be characterized in determining the layout of the images by using a Fibonacci number series. Here, when using the Fibonacci number series, it may be understood that the present invention is characterized in determining the layout of the images by applying the Fibonacci number series to angles. Or, when using the Fibonacci number series, the present invention may be characterized in determining the position of images by applying the Fibonacci number series to a distance. Or, although not described in particular in the embodiment described above, when using a Fibonacci number series, it is also possible to determine the position of an image by applying the Fibonacci number series to the direction (slope) of the image. Or, when using a Fibonacci number series, it is also possible to characterize the present invention in determining the position of an image by applying an isometric spiral (a spiral in which the straight line that connects a vertex and an arbitrary point on the curve always has the same angle as the tangent to the curve on this point) in which a Fibonacci number series appears.

Here, when using the Fibonacci number series, it is possible to determine the position of an image based on the golden angle that appears in the arrangement of the leaves of a plant (at an angle of 130° to 144°, more preferably 137.5°). In addition, when determining the position of the nth image (where n is an integer equal to or greater than 2), the position of the nth image can be set on the line along the mth golden angle (where m is equal to or greater than 0) at the point in time that the overlap with other images has been eliminated or the point in time that the images have become separated by a distance that is equal to or greater than a certain interval while the increase in the distance is extended as Fibonacci numbers (one among 1, 1, 2, 3, 5, 8, 13, 21, 34, 55, 89, 144, 233, . . . , or a combination of several, for example, set alternating between 21 and 34). Or, when determining the position of the nth image, the position of the nth image can be set on the line along the mth golden angle at the point in time that the overlap with other images has been eliminated or the point in time that the images are separated by a distance that is equal to or greater than a certain interval, where the increase in distance follows a Fibonacci number series while the distance from the initial point is gradually offset.

In addition, it is possible to understand that this invention is characterized in that, in the case that the position of one or more images has not been determined as a result of calculating the positions of all the images, the positions of the images are recalculated by offsetting the initial position by one pixel or a plurality of pixels. Furthermore, it can be understood that the present invention is characterized in that, in the case that the position of one or more images has not been determined even when recalculation has been carried out after the initial position has been offset, the initial position is calculated after being offset again, and this calculation is repeated until the positions of all the images haves been determined.

In addition, in the image layout device of the present invention, in the case that layout area determined by the layout angle determining device (the layout angle setting unit 106A) is substantially identical to the layout angle determined before for the image, the center position of the layout angle is changed by the layout angle center position determining device (the layout angle center position setting unit 105A). Thereby, in the image layout device of the present invention, in the case that a suitable layout relationship cannot be obtained at one layout angle center position (that is, in the case that the desired number of images cannot all be laid out), a different layout is automatically attempted, and thereby the possibility that a suitable solution will be obtained is increased.

In addition, in the image layout device of the present invention, the layout angle determining device determines the layout angle for each of the images based on an angle between 130° and 144°, which includes the golden angle found by $360°/(1+(1+\sqrt{5})/2)$, that serves as a golden angle, and is multiplied by an integer. Thus, when there is a low number of images, by approximating the golden angle using, for example, a rational number, it is possible to simplify the computation process further.

In addition, in the image layout device of the present invention, the layout angle center position determining device uses as the layout angle center position any of the lattice points created when the area was segmented into a lattice shape. Thereby, in the image layout device of the invention, the layout angle center position is determined under the constant condition of the lattice point (center point) within a particular area produced when segmented into a lattice shape, and thus it is possible to guarantee a constant reproduction as a result of the image layout, and, for example, the user can easily anticipate the result of the automatic layout.

In addition, in the image layout device of the present invention, the layout angle center position determining device uses an arbitrary point outside the area as the layout angle center position. Thereby, the image layout device of the present invention can make the distance between the layout angle center position and each of the laid out images comparatively large, and thus in comparison to the case in which the layout angle center position is set within the area, it is possible to obtain layout relationships that have different slopes.

Another exemplary embodiment of the present invention is a method in which a plurality of electronic images are laid out within a particular area, and is characterized in providing a layout angle center position setting device that determines the center position of the layout angle at an arbitrary position within an area; a layout angle determining step that determines the layout angle for each of the images based on the predetermined angle, where the layout angle center position determined by the layout angle center position determining device serves as the reference; and a layout position determination step that determines the layout position for each of the images depending on the overlap between each of the images based on a predetermined angle. In addition, another embodiment of the present invention is a program for automatically laying out a plurality of electronic images within a particular area, and includes a description for execution using a computer a layout angle determining process that determines the layout position for each of the images based on an angle that is an integer multiple of the golden angle, and a layout position determination process that determines the layout position for each of the images depending on the overlap of each of the imaged due to the angle determined by the layout angle determination process.

Third Exemplary Embodiment

Below, a third embodiment of the present invention will be explained with reference to the figures.

Figure 9:
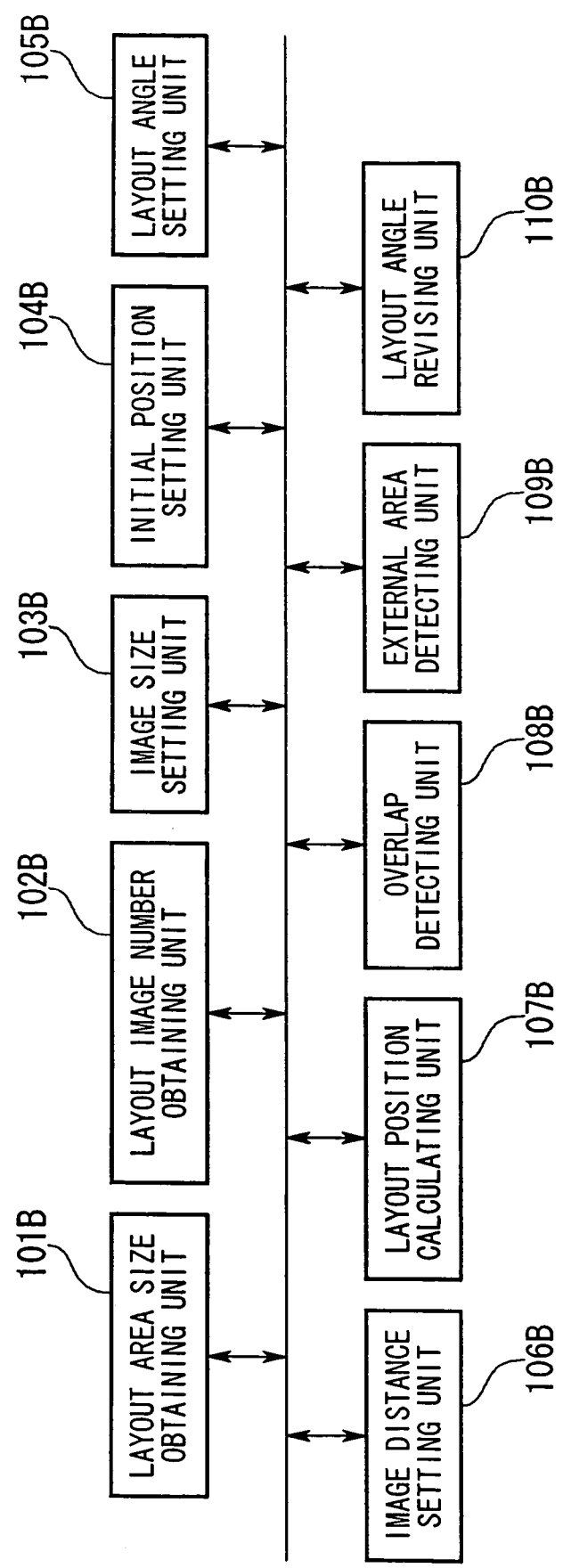
FIG. 9 is a block diagram showing an example of the structure of the image layout device of the invention.
Figure 10:
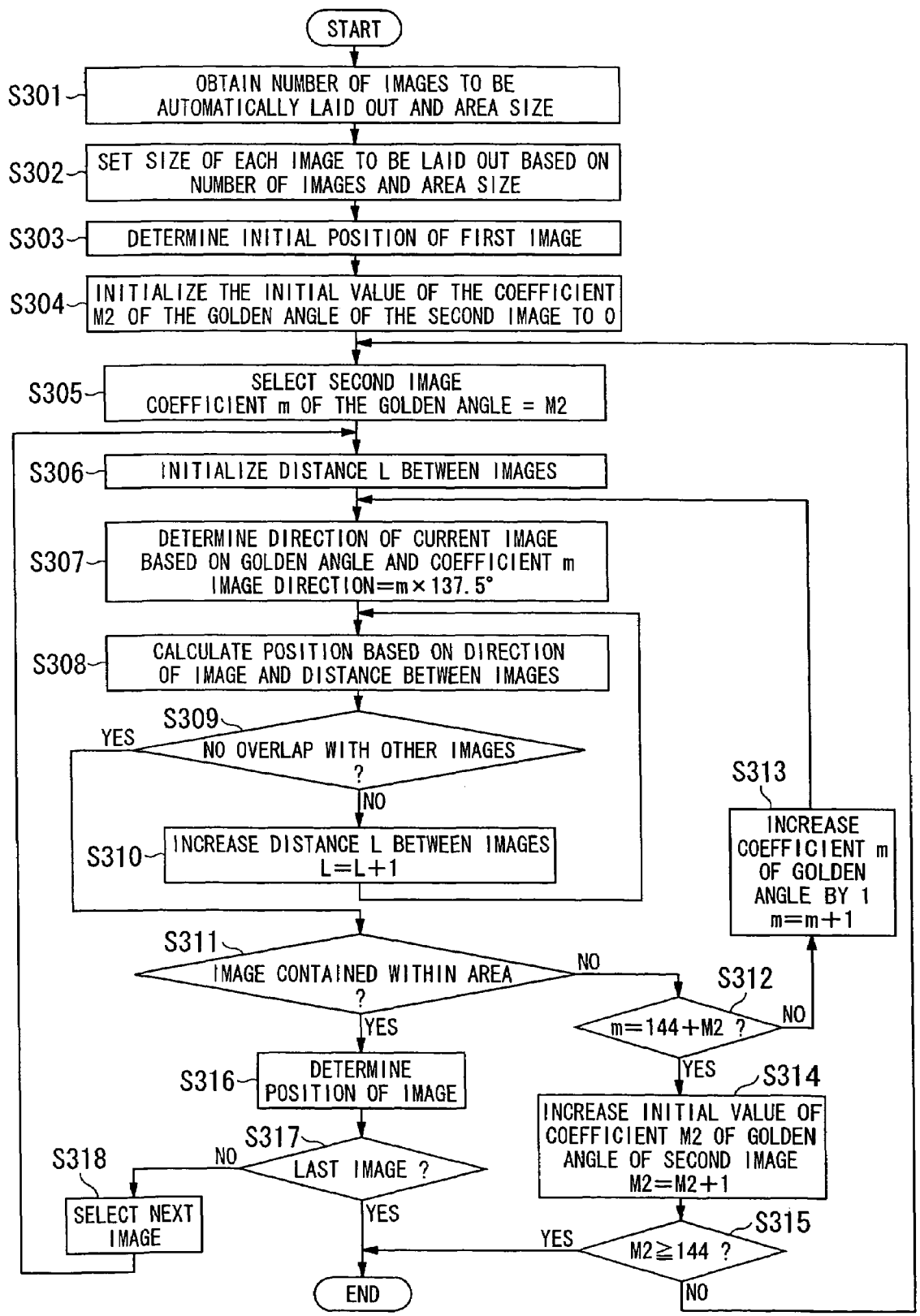
FIG. 10 is a flowchart showing an example of the operation of the structure in FIG. 9.

FIG. 9 is a block diagram for explaining the structure of the image layout device of the present invention. FIG. 10 is a flowchart for explaining an example of the operation thereof. The image layout device of the present embodiment is structured by a general use computer that provides a central processing unit, a memory device, keyboard, mouse, display device, a memory device that uses a optical recording medium or the like; peripheral devices, such as a printer, digital camera and the like; and a program for image layout processing that is executed on a predetermined system software by a computer. FIG. 9 shows each of the functions of the image layout processing program divided into blocks.

In FIG. 9 and FIG. 10, an image layout device (image layout program) that is started up due to an operation by the user (operator) obtains an area size for laying out the images that the user has indicated by using a graphical user interface or the like between the user and the image layout device by a layout area size obtaining unit 101B. In addition, similarly, the layout image number obtaining unit 102B obtains the number of images that have been indicated by the user to be automatically laid out (step S 301 in FIG. 10).

The image size setting unit 103B sets the size (width and height) when laying out each of the images based on the obtained number of images and area size (step S 302). The initial position setting unit 104B sets the initial position (X0, Y0) of the image to be laid out first (step S 303). For the determination method for the initial position, generation by random numbers, setting at the center of the area, setting by a user action, or predefined definition data can be considered for obtaining the initial position. In addition, when the image is laid out with respect to an initial position, it is necessary to consider the case in which the center of the image is aligned with the initial position, the case in which the center of gravity of the image is aligned with the initial position, and the case in which the center of a circumscribed rectangle of the image is aligned with the initial position.

The layout angle setting unit 105B initializes the initial value of the coefficient M2 of the golden angle of the second image to 0 (step S 304). The layout angle setting unit 105B additionally selects the second image as the image that is to be laid out, and then sets the coefficient m (where m is an integer equal to or greater than 0) of the golden angle to M2 (step S 305). Next, the image distance setting unit 106B initializes the distance L between images to a predetermined initial value (step S 306). Here, L is initialized to 0.

The golden angle denotes the angle in which the circumference 360° is divided by $1:(1+\sqrt{5})/2$, and is found to be $360°/(1+(1+\sqrt{5})/2)=137.507764$. This golden ratio is known to express the aesthetically pleasing rectangular aspect ratio having the greatest balance. The golden angle is known, for example, in the arrangement of the leaves, where the overlap between leaves is made small by leaves sprouting from branches at the golden angle, making it possible to optimally distribute the sunlight and rain. In the present embodiment, the layout angle for each image is determined based on an angle that is m times (an integer multiple) the golden angle, and the layout position for each of the images is determined depending on the overlap between each of the images using this determined angle. The layout angle setting unit 105 determines the direction θ (layout angle θ) that the image being laid out should be laid out based on the golden angle and the coefficient m by using the calculation θ=m×golden angle (step S 307).

Note that in the present embodiment, as a concrete value for the golden angle, the range of values from 130° to 144° is used. However, the most preferable example of the value of the golden angle is approximately 137.5°, which is calculated based on the Fibonacci number series. In this example, 137.5° will be used as the set value of the golden angle.

The image position calculating unit 107B calculates the layout position for each of the images from the initial position (X0, Y0) found by the initial position setting unit 104B and the direction θ in which the image is to be laid out and the distance L between images, which are respectively found by the layout angle setting unit 105B and the image distance setting unit 106B (step S 308). In the image position calculating unit 107B, a new image position (X, Y) can be calculated based on the following formulae:

$$X = L_p \times \cos θ + X0$$

$$Y = L_p \times \cos θ + Y0$$

In this example, the layout angle for each of the images is determined by making the initial position (X0, Y0) at which the first image is to be laid out, which is found by the initial position setting unit 104B, the center position of the rotation, but it is also possible to set the center position of the rotation arbitrarily.

The overlap detecting unit 108A compares the image position (X, Y) found by the image position calculating unit 107A and the position of the other image calculated up to this point in time, and determines whether or not any of the images overlap (step S 309). In the case that the overlap detecting unit 108A determines that images overlap, the distance between the new images is calculated again by the image distance setting unit 106B (in step S 310, NO from step S 309).

The image distance setting unit 106B simply increases the distance L between images one pixel each time, where one pixel serves as the unit, so that L=L+1. In addition, the processing in steps S 308 to S 310 is executed repeatedly until the overlap with other images is eliminated by using the increased distance L between images.

When it is determined in step S 309 that there is no overlap (YES in step S 309), in the case that the image is laid out at the new image position (X, Y) calculated by the image position calculating unit 107B, the external area detecting unit 109B determines whether or not the image protrudes from the layout area initially obtained (step S 311). In the case that the external region detecting unit 109B determines that the image is protruding (NO in step S 311), the direction of the image is again changed by the layout angle revising unit 110B (that is, the coefficient m is changed), and whether or not the image can be laid out at another position (executing the process in step S 307 and after again, via step S 313) is calculated. However, before carrying out this recalculation, it is determined whether or not the direction after the revision is set to a direction for which an image position has not been calculated (step S 312).

For example, in the case that the set value of the golden angle is 137.5° and the initial value of the rotation direction is 0° (m=0), the layout angle θ when the direction has been changed 144 times becomes θ=m×137.5°=144×137.5°=360°×55, and this means that m=0 is equivalent to the layout angle θ=0°. That is, when the coefficient m has been changed 144 times or more, the calculation is repeated for directions identical to those that have already been calculated. In the present embodiment, the initial value of the coefficient m of the golden angle of the second image (the image initially is laid out at the position offset from the coordinate system along the direction of the golden angle) is set by the variable M2. This variable M2 is the variable whose value is increased by 1 each time in step S 314. Thus, the initial value of the rotation direction is not always constant at 0° (m=0), but is a value changed by M2×137.5° (m=M2). Thereby, it can be determined whether or not the initial direction has become the same and whether or not the coefficient m is equivalent to (144+variable M2). Thus, in step S 312, by determining whether or not the coefficient m (144+M2) is equivalent, it is determined whether or not there are still directions for which the image position has not been calculated. In addition, in the case that there are directions for which the image position has not been calculated, the layout angle θ is set to another direction, and the layout processing of the image is carried out.

Therefore, in this case, when the external area detecting unit 109B has determined that the image is protruding (NO in step S 311), only when the coefficient m is less than (144+M2) (NO in step S 312), the coefficient m is increased by 1 (step S 313), and the calculation in step S 307 and after is carried out again by the layout angle setting unit 105B, the image distance setting unit 106B, and the initial position calculating unit 107B (step S 307 via step S 313 from NO in step S 312). Here, the processing in steps S 312 to S 313 is carried out in the block shown in FIG. 9 for the layout angle revising unit 110B, the external area detecting unit 109B, and the like, or this processing can be carried out by other function blocks (not illustrated).

In contrast, in the case that the coefficient m is equal to (144+M2) (YES in step S 312), this means that under the initial conditions in this case not all of the images can be laid out, and thus in step S 314, processing is carried out in which the initial conditions (here, the layout direction of the image that is laid out second) when carrying out layout processing are changed. This processing is executed by the layout angle revising unit 110B. In the present embodiment, processing is carried out in which the initial value of the coefficient M2 of the second golden angle is increased from the current value by 1. The initial value of the coefficient M2 of the second golden angle is the value used when the coefficient m of the golden angle of the second image is set in step S 305. Therefore, the processing in step S 306 and after is carried out after changing the initial value of the coefficient M2 of the golden angle, and thus it is possible to carry out the layout of the images under different initial conditions. However, after changing the initial value of the coefficient M2 of the golden angle in step S 314, in step S 315, it is determined whether or not the coefficient m of the golden angle of the second image determined thereby in step S 315 has become equal to the value used previously. That is, in this example, the layout direction θ is the same direction both in the case that the coefficient m of the golden angle is 144 and in the case that the coefficient m of the golden angle is 0, and thus in the case that the coefficient m of the golden angle is equal to or greater than 144, the layout processing ends (YES in step S 315).

In the case that the coefficient m of the golden angle of the second image is not equal to the value used previously (NO in step S 315), the processing returns to step S 305, the second image serves as the image that is the object of processing, a new coefficient for the golden angle is used (the value increased by 1 from the previous time), and the processing in step S 306 and after is executed again.

Note that in step S 312 and step S 315, it is determined whether or not there is an uncalculated direction based on whether or not the coefficient m is equal to (144+M2) and equal to or greater than 144, but in the case that the set value (approximate value) of the golden angle has been set to a value other than 137.5°, the value that becomes the reference for this determination must be suitably changed depending on this set value.

In contrast, in the case that the overlap detecting unit 108B has determined that there is no overlap (YES in step S 309), and the external region detecting unit 109B has determined that the image does not protrude outside the layout area (YES in step S 311), the layout position of the image is set (step S 316).

Next, in the initial position setting unit 104B, it is confirmed whether or not there are any images whose layout position is to be calculated, and in the case that unprocessed images remain (NO in step S 317), the next image is selected (step S 318), and the layout calculation is continued (step S 306 and after). In this case, for the next image, only the distance between images is initialized, and the coefficient m of the golden angle uses the value identical to the one that was used for the previous image as the initial value. In contrast, in the case that the layout of all images has been determined, the processing ends (YES in step S 317).

Figure 11:
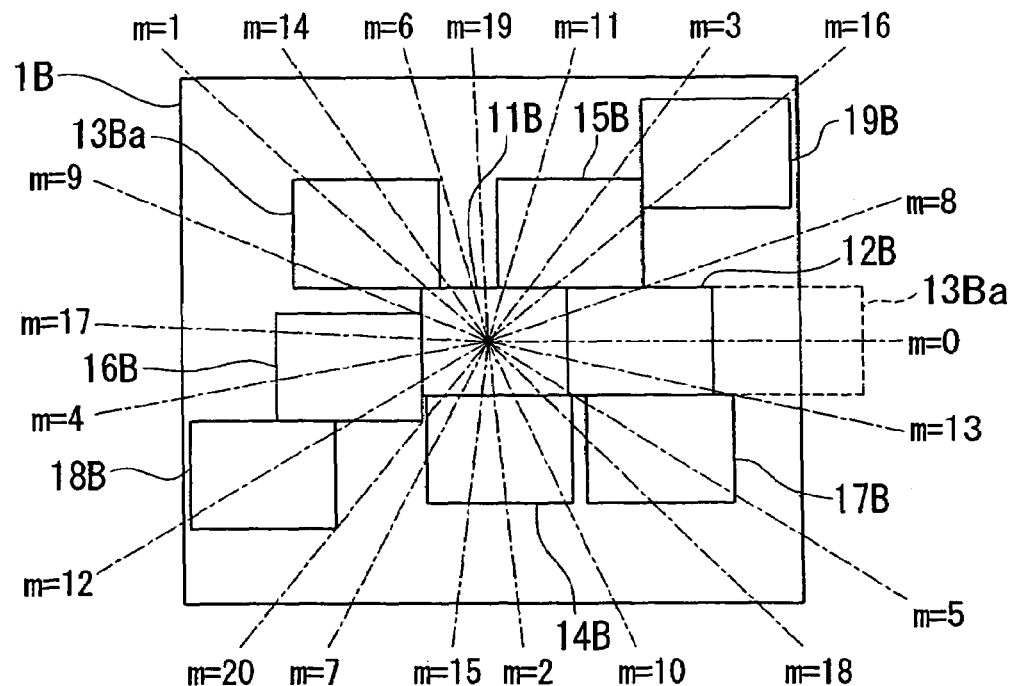
FIG. 11 is a drawing showing an example of image layout (midcourse in the processing) using the structure and flowchart in FIG. 1 and FIG. 2.
Figure 12:
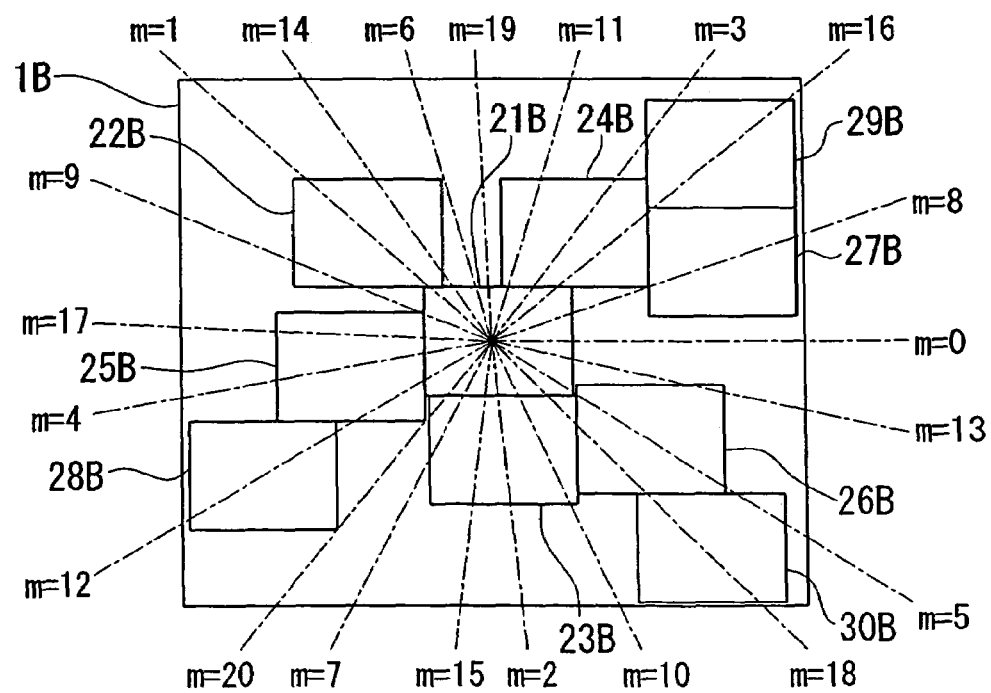
FIG. 12 is a drawing showing an example of image layout (after completion of the processing) using the structure and flowchart in FIG. 1 and FIG. 10.

FIG. 11 and FIG. 12 show an example of the layout of a plurality of images by the processing shown in FIG. 10. The example shown in FIG. 11 is an example of the layout in the case that the first image 11B is laid out at the center of the layout area 1B and the coefficient m of the golden angle of the second image 12B is 0. In contrast, FIG. 12 shows an example of the layout in the case that the first image 21B is laid out at the center of the layout area 1B and the coefficient m of the golden angle for the second image 22B is 1 (=0+1).

In the example shown in FIG. 11, the first image 11B is laid out at the center of the layout area 1B and then the second image 12B is laid out in the direction m=0 (0°). The third image 13B cannot be laid out in the direction m=0 (0°) (because the image 13B shown by the broken line protrudes from the layout area 11B), and thus is laid out in the direction m=1 (137.5°). In addition, the fourth image 14B is laid out in the direction m=2 (275°), the fifth image 15B is laid out in the direction m=3, the sixth image 16B is laid out in the direction m=4, and the seventh image 17B is laid out in the direction m=5. In addition, the eighth image cannot be laid out in the direction m=6 to m=11, and thus it is laid out in the direction m=12. The ninth image 19B cannot be laid out in the directions m=13 to m=15, and thus it is laid out in the direction m=16. In this manner, in the example shown in FIG. 11, in the case that the coefficient m of the golden angle of the second image 12B is set to 0, all nine images are laid out based on the coefficient of the golden angle.

In contrast, in the example shown in FIG. 12, a plurality of images having the same size is laid out in the layout area 1 identical to that in FIG. 11. However, by making the coefficient m of the golden angle for the second image 22B set to 1, the number of images that can be laid out is increased to 10. That is, the first image 21B is laid out at the center of the layout area 1B, and next the second image 22B is laid out in the direction m=1 (137.5°). Then the fourth image 24B is laid out in the direction m=3, the fifth image 25B is laid out in the direction m=4, and the sixth image 26B is laid out in the direction m=5. In addition, the seventh image 27B cannot be laid out in the directions m=6 to m=7, and thus it is laid out in the direction m=8. The eighth image 28B cannot be laid out in the directions m=9 to m=11, and thus it is laid out in the direction m=12, the ninth image 29B cannot be laid out in the direction having m=1 to m=15, and thus it is laid out in a direction having m=16. The tenth image 30B cannot be laid out in the direction m=17, and thus it is laid out in the direction m=18. In this manner, in the example shown in FIG. 12, by making the coefficient m of the golden angle of the second image 22 set to 1, a total of 10 images can be laid out based on the coefficient of the golden angle.

In the manner described above, in the present embodiment, the layout rules for images is determined depending on a rule known to regulate a regular aesthetic satisfaction that appears in nature. Furthermore, the layout of each of the images can be determined based on the position of images previously disposed when each of the pictures is laid out in sequence. Therefore, a conventionally required complicated sequence of calculations for finding the net force between each of the images becomes unnecessary. In addition, the applied rule can easily recreate the natural beauty that humans have been accustomed to for ages. Thereby, when applied to electronic photograph albums as well, it becomes possible to recreate easily the aesthetically pleasant layout that people feel more naturally. Furthermore, in the case that the layout of the number of desired images under predetermined initial conditions is not possible, the layout of the images is carried out by changing the initial value of the layout area, and thus the number of images that can be laid out can be increased.

Note that in the operation of the image distance setting unit 106B explained with reference to FIG. 10, the distance between images was simply increased 1 pixel each time, where 1 pixel serves as a unit, such that the distance L between images becomes L=L+1. However, the method of incrementing the distance L between images is not limited thereby. For example, it is possible to increase the distance by, for example, 5 pixels, where a plurality of pixels serves as the unit, or change the increase value according to the Fibonacci number series.

The Fibonacci number series is a number series determined by the recursive formula $a_{n+2}=a_n+a_{n+1}$ from the initial values a0 and a1. For example, when a0=1 and a1=1, the Fibonacci number series becomes 1, 1, 2, 3, 5, 8, 13, 21, 34, 55, 89, . . . In addition, the ratio of the number (term) that the Fibonacci number series approaches is 1/1=1, 2/1=2, 3/2=1.5, 5/3=1.666 . . . , . . . , 89/55=1.61818 . . . , etc., and approaches the golden mean of $1:(1+\sqrt{5})/2$. The increase in the distance can be changed by a combination of Fibonacci numbers (for example, alternately using 21 and 34), or depending on a Fibonacci number series (for example, in the series 1, 1, 2, 3, 5, 8, 13, 21, 34, 55, 89, . . . ).

Figure 13:
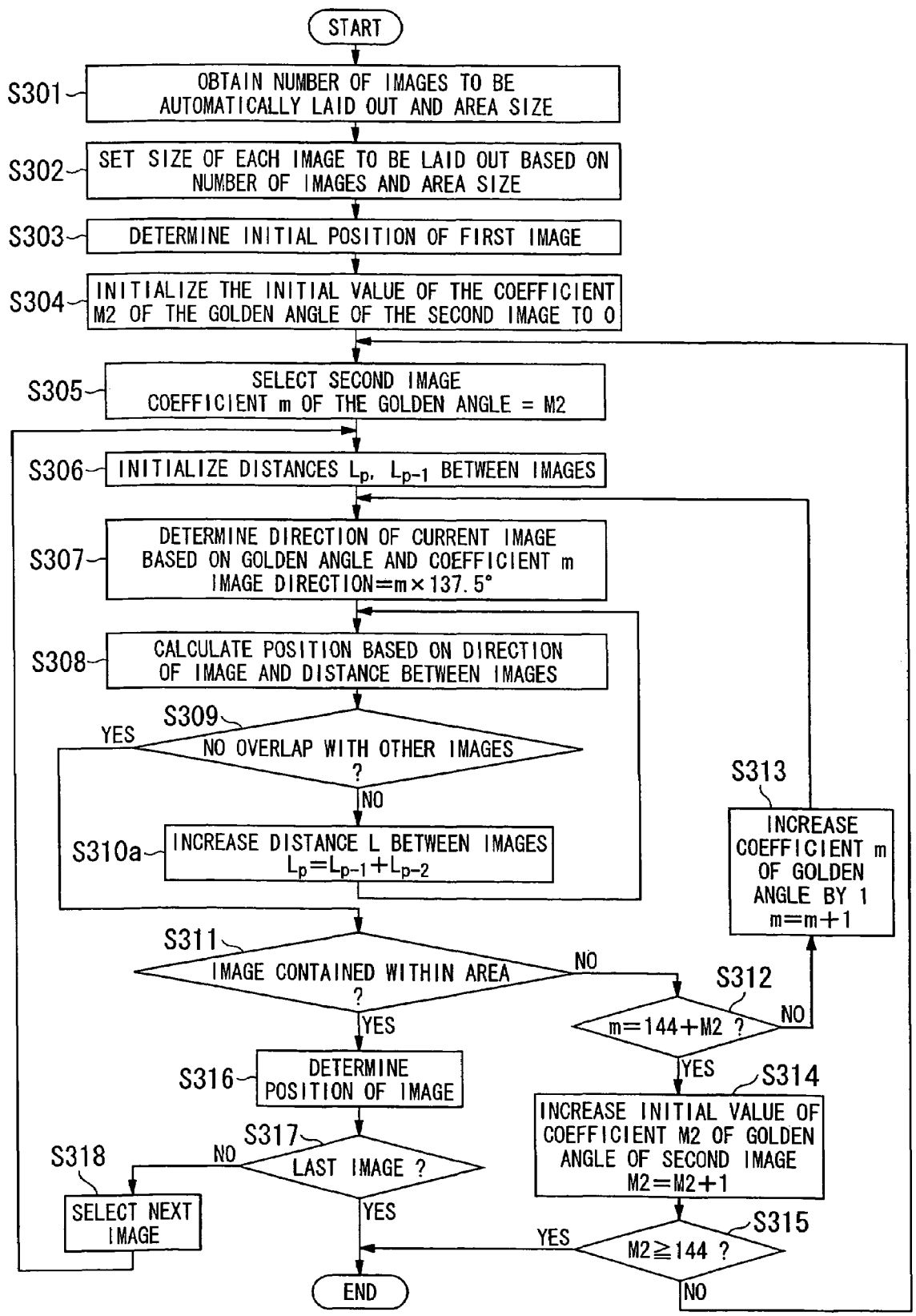
FIG. 13 is a flowchart showing another example of the operation of the structure in FIG. 9.

FIG. 13 shows a flowchart for the case in which the increase is changed depending on a Fibonacci number series. In the flowchart shown in FIG. 13, the content of steps S 306a and S 310a in FIG. 13 and steps S 306 and S 310 in FIG. 10 are different from those in the flowchart shown in FIG. 10. The other steps are identical. In the example shown in FIG. 13, the image distance setting unit 106 sets the distance $L_p$ between images according to a Fibonacci number series such that $L_p=L_{p-1}+L_{p-2}$. Here, $L_{p-1}$ and $L_{p-2}$ are the values of the distance $L_p$ between images respectively used the first time and second time when determining the overlap of the images while gradually increasing the distance $L_p$ between images a predetermined amount each time.

Note that the embodiment of the present invention is not limited to the above, and for example, the following change is possible. For example, when determining the layout position while gradually increasing the distance from the initial position each time by the image distance setting unit 106B, it is sufficient that the overlap with other images is eliminated and a position at which the distance between images is equal to or greater than a constant interval is determined as the layout for the images. Specifically, it is sufficient that the layout between images be determined so that there is a space having a predetermined interval.

In addition, at the overlap detecting unit 108B, it is also possible that in addition to the determination in which the conditions are satisfied only the case in which the overlap between each of the images is completely eliminated, there can also be the determination in which conditions are satisfied when the overlap is within a range providing a permissible overlap set in advance. Specifically, it is also possible to determine the layout positions in a condition wherein overlap between each of the images occurs when within a predetermined amount for an overlap set in advance.

In addition, in the examples described above, when determining the position of the nth image (where n is an integer equal to or greater than 2), in the case the layout position that satisfies the conditions related to overlap with another image is obtained by increasing the distance from the initial position (X0, Y0) on the extension of the mth golden angle (where m is an integer equal to or greater than 0), when it is determined that the image protrudes from a particular area in step S 311, on the extension along the m+1 golden angle (where m is increased by only 1 in step S 313), the position of the image is found again after increasing the distance from the initial position (recalculate from step S 306). In contrast, for example, even when the image is accommodated within the area, in the case that overlap with another image would occur when the distance has been extended by an amount equal to or greater than a predetermined amount, that is, in the case that, even if the image is within the area, when the clearance with the border of the area is small, and the result of a determination is obtained in step 311 that is equivalent to protruding from the area. In addition, according to the flowchart in FIG. 10, in the case that as a result of the calculation of the positions of all the images the position of one or more images has not been determined (the case in which they could not be laid out), it is possible to offset the initial position (X0, Y0) by one pixel or a plurality of pixels, and recalculate the position.

Figure 14:
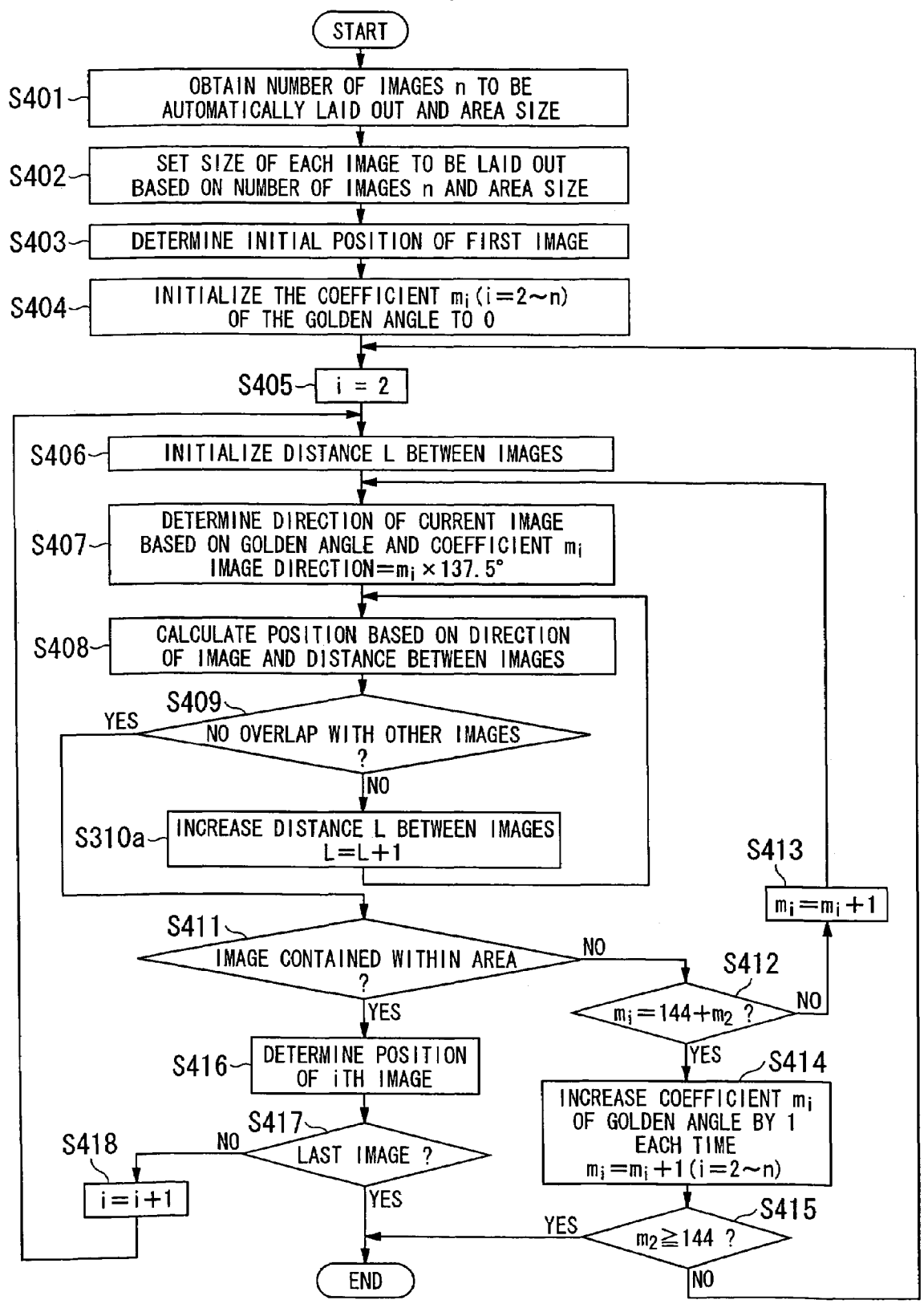
FIG. 14 is a flowchart showing another example of the operation of the structure in FIG. 9.

Next, another example of the operation according to the structure in FIG. 9 will be explained with reference to FIG. 14. The example of the operation in FIG. 14 is one in which a part of the example of the operation in FIG. 10 has been changed. In the example of the operation in FIG. 10, in the case that a certain image cannot be laid out, after changing the initial value of the layout of the direction of the second image, which is the first image is laid out based on an angle, the layout of the second image is corrected again, subsequently, the layout position of the image is confirmed by using the layout direction (coefficient m) determined for the image one before as the initial value, and depending on the results of the confirmation, the layout position is determined. For example, it is confirmed whether or not the layout direction (coefficient m) of the second image can serve as the initial value for the layout direction of the third image. In the case that it can be laid out, its position is set, and in the case that it cannot be laid out, the layout direction is revised. In contrast, in the example of the operation shown in FIG. 14, in the case that a certain image cannot be laid out, after changing the initial value of the layout direction of all images, the possibility that each of the images can be laid out by using the initial value is confirmed. For example, in the case that the nth image cannot be laid out, the initial values of the layout directions for each of the second, third, fourth, . . . images are changed. Concretely, the coefficients that indicate the layout directions for each of the images last determined are each increased by one, and these coefficients serve as the initial values. In addition, it is confirmed whether or not the images can be laid out with the changed layout directions serving as the initial values. In the example of the operation in FIG. 15, in order to attain this, the coefficients m, which store the coefficients that denote the layout directions, are associated with each of the images and used in plurality.

In the flowchart shown in FIG. 14, the variable i is used as the variable that denotes the order of the images. For example, for the second image, i=2, and for the nth image, i=n. In addition, the variable $m_i$ is newly used for storing the coefficients m of the golden angles for each of the images. Here, the subscript i of the variable mi is the variable indicating the order of the images. For example, m2 is the variable that stores the coefficient m of the golden angle of the second image, and mn is the variable that stores the coefficient m of the golden angle of the nth image. In the example of the operation shown in FIG. 14, in the case that images cannot be laid out, when the initial values of the layout directions are changed, the coefficient $m_i$ of the golden angle that has been determined for each of the images whose layout cannot be determined is increased by one each, and this increased value is used as the initial value for the coefficient m of the golden angle when the new layout is determined.

For example, assuming that under the initial conditions it has been determined that the coefficient m2 of the golden angle of the second image is 0, the coefficient m3 of the golden angle of the third image is 0, the coefficient m4 of the golden angle of the fourth image is 1, . . . , then when the nth image cannot be laid out, under the next conditions, the initial value of the coefficient m2 of golden angle of the second image is set to 1, the initial value of the coefficient m3 of the golden angle of the third image is set to 1, the initial value of the coefficient m4 of the golden angle of the fourth image is set to 2, . . . , the then the layout of each of the images is attempted again.

Concretely, the processing in step S 404 and step S 414 shown in FIG. 14 differs from the processing in step S 304 and step S 314 in the corresponding processing in FIG. 10. Note that each of the steps S 401 to 403, S 405 to S 413, and S 415 to S 418 shown in FIG. 14 carry out processes that are substantially identical to those in each of the steps S 301 to S 303, S 305 to S 313, and S 315 to S 318 shown in FIG. 10.

First, the number n of the images to be automatically laid out and the area size are obtained (step S 401), and the size of each of the images when laid out is set based on the number n of images and the area size (step S 402). Next, the initial value of the first image is determined (step S 403), and the variable $m_i$ for the nth image from the second image is initialized to 0 (step S 404). Next, the variable i is set to 2, and the second image becomes the object of layout (step S 405).

The decision processing for the layout position for the ith image is carried out by the processing in steps S 406 to S 413, like the processing in steps S 306 to S 313 shown in FIG. 10. In addition, when the image can be laid out, the position of the image is set (step S 416), and in the case that the last image cannot be laid out (NO in step S 417), the variable i is increased by 1, the next image is selected (step S 418), and the processing of step S 416 and after is executed again. Here, in the processing in step S 416, the coefficient value of the golden angle when the position of the ith image is determined is stored in the variable $m_i$.

In contrast, under the current initial conditions, in the case that n images cannot be laid out even after the coefficient $m_i$ of the golden angle has been revised up to $144+m_2$ (YES in step S 412), layout is attempted again after changing the initial conditions. The variable $m_2$ here is the initial value of the coefficient of the golden angle of the second image, and corresponds to the variable M2 in FIG. 10. For example, when the coefficient $m_2=0$ (or $m_2=1$, m2=2, . . . ), there is the case in which the an image direction of 0° (or 137.5°, 275°, . . . ) serves as the initial value of the layout direction, and when images cannot be laid out even after revising the layout direction 144 times, the layout is attempted again at an angle of 0° (or 137.5°, 275°, . . . ), and thus the initial conditions are changed to avoid confirmation in the same direction. At this time, in the example shown in FIG. 14, the initial values of the coefficients $m_2$ to $m_n$ of the golden angle of the second to nth image are changed by adding 1, starting from the value that has been determined up to this time (step S 414).

By this processing, for example, after the coefficient $m_2$ of the golden angle of the second image has been set to 0, the coefficient $m_3$ of the golden angle of the third image has been set to 1, . . . , in the case that there are images that cannot be laid out and the layout processing is carried out again, the initial value of the coefficient $m_2$ of the golden angle of the second image is set to 1, the initial value of the coefficient $m_3$ of the golden angle of the third image is set to 2, . . . , and the layout of each of the images is attempted again.

Note that the embodiment of the present invention can be realized by a computer and a program that is executed on this computer, and this program can be delivered on a telecommunication line or via a computer readable media. In addition, each of the parts shown in FIG. 9 can be further segmented or combined, and can be laid out after being distributed over a telecommunication line.

Note that the present invention was explained based on the golden angle described above, but it can also be understood that the embodiment of the present invention may have the following characteristics. Specifically, the present invention may automatically determine the position of one or a plurality of images within a particular area, and may be understood to be characterized in determining the layout of the images by using a Fibonacci number series. Here, when using a Fibonacci number series, it may be understood that the present invention is characterized in determining the layout of the images by applying a Fibonacci number series to angles. Or, when using a Fibonacci number series, the present invention may be characterized in determining the position of images by applying a Fibonacci number series to a distance. Or, although not described in particular in the embodiment described above, when using a Fibonacci number series, it is also possible to determine the position of an image by applying a Fibonacci number series to the direction (slope) of the image. Or, when using a Fibonacci number series, it is also possible to characterize the present invention in determining the position of an image by applying an isometric spiral (a spiral in which the straight line that connects a vertex and an arbitrary point on the curve always has the same angle as the tangent to the curve on this point) in which a Fibonacci number series appears.

Here, when using the Fibonacci number series, it is possible to determine the position of an image based on the golden angle that appears in the arrangement of the leaves of a plant (at an angle of 130° to 144°, more preferably 137.5°). In addition, when determining the position of the nth image (where n is an integer equal to or greater than 2), the position of the nth image can be set on the line along the mth golden angle (where m is equal to or greater than 0) at the point in time that the overlap with other images is eliminated or the point in time that the images becomes separated by a distance that is equal to or greater than a certain interval while the increase in the distance is extended as Fibonacci numbers (one among 1, 1, 2, 3, 5, 8, 13, 21, 34, 55, 89, 144, 233, . . . , or a combination of several, for example, set alternating between 21 and 34). Or, when determining the position of the nth image, the position of the nth image can be set on the line along the mth golden angle at the point in time that the overlap with other images is eliminated or the point in time that the images are separated by a distance that is equal to or greater than a certain interval, where the increase in distance follows a Fibonacci number series while the distance from the initial point is gradually offset.

In addition, it is possible to understand that is invention is characterized in that, in the case that the position of one or more images has not been determined as a result of calculating the positions of all the images, the position of the images is recalculated by offsetting the initial position by one pixel or a plurality of pixels. Furthermore, it can be understood that the present invention is characterized in that, in the case that the position of one or more images has not been determined even when recalculation has been carried out after the initial position has been offset, the initial position is calculated after being offset again, and this calculation is repeated until the positions of all the images has been determined.

In the manner described above, in the image layout device of the present invention, the layout angle determining device (layout angle setting unit 105B) determines the layout angle for each of the images by using the initial position with which the first image is laid out as the center position of rotation. Thereby, the layout position of the first image is set, and at the same time, it is possible to set the center position of rotation of the layout of the other images.

As described above, in the image layout device of the present invention, the layout angle determining determines the layout angle for each of the images based on an angle between 130° and 144°, which includes the golden angle found by $360°/(1+(1+\sqrt{5})/2)$, that serves as a golden angle, and is multiplied by an integer. Thus, when there is a low number of images, by approximating the golden angle using, for example, a rational number, it is possible to simplify the computation process further.

In the image layout device of the present invention, in addition, after the layout angle revising device (the layout angle revising unit 110B) has increased by a predetermined amount the value that is an integer multiple of a predetermined angle used as the reference for the image whose layout position has been determined, the layout angle determining device determines the layout angle for each of the images again, and the layout position determining device (the image distance determining unit 106B, the image position calculating unit 107B, and the overlap detecting unit 108B) determines the layout position of images at a position where there is no overlap while offsetting the image by a predetermined amount each time. As a result, in the image layout device of the present invention, because the layout of an image is carried out again by changing the layout direction of the image with respect to images whose layout already been determined, it is possible to carry out the layout using a plurality of image layout examples, and thereby it is possible to lay out many more images in the same area. In addition, it is possible to generate a variety of layout patterns for the same number of images.

In the image layout device of the present invention, in addition, after the layout angle revising device has increased by a predetermined amount the value that is an integer multiple of a predetermined angle used as the reference for the image whose layout position has been, the layout angle determining device determines the layout angle for each of the images again, and the layout position determining device sets the layout position of the images at a position where there is no overlap and a distance that separates the images by a constant value or greater while offsetting the image by a predetermined amount each time. As a result, in the image layout device of the present invention, in the image layout device of the present invention, because the layout of an image is carried out again by changing the layout direction of the image with respect to images that have already been determined, it is possible to carry out the layout using a plurality of image layout examples, and thereby it is possible to lay out many more images in the same area. In addition, it is possible to generate a variety of layout patterns for the same number of images. Furthermore, it is possible to provide a constant gap between the images.

Another embodiment of the present invention is a method in which a plurality of electronic images are laid out within a particular area, and is characterized in providing a layout angle determination step in which the layout angle for each of the images is determined based on an angle that is an integer multiple of the predetermined angle, a layout position determining step in which the layout position for each of the images is determined depending on the overlap between each of the images due to the angle determined by the layout angle determining step, and a layout angle revision step that revises the multiple integer value of a predetermined angle that serves as a reference in the layout angle setting device in the case that there is an image for which the layout position cannot be determined within a particular are in the layout position determining step. In addition, another embodiment of the present invention is a program for automatically laying out a plurality of electronic images within a particular area, and includes a description for execution using a computer of a layout angle determining process that determines the layout angle for each of the images based on an angle that is an integer multiple of the predetermined angle, a layout position determining step that determines the layout position for each of the images depending on the overlap between each of the images due to the angle determined by the layout angle determination step, and a layout angle revision step that revises the multiple integer value of a predetermined angle that serves as a reference in the layout angle setting device in the case that there is an image for which the layout position cannot be determined within a particular area in the layout position determining step.

Fourth Exemplary Embodiment

Figure 15:
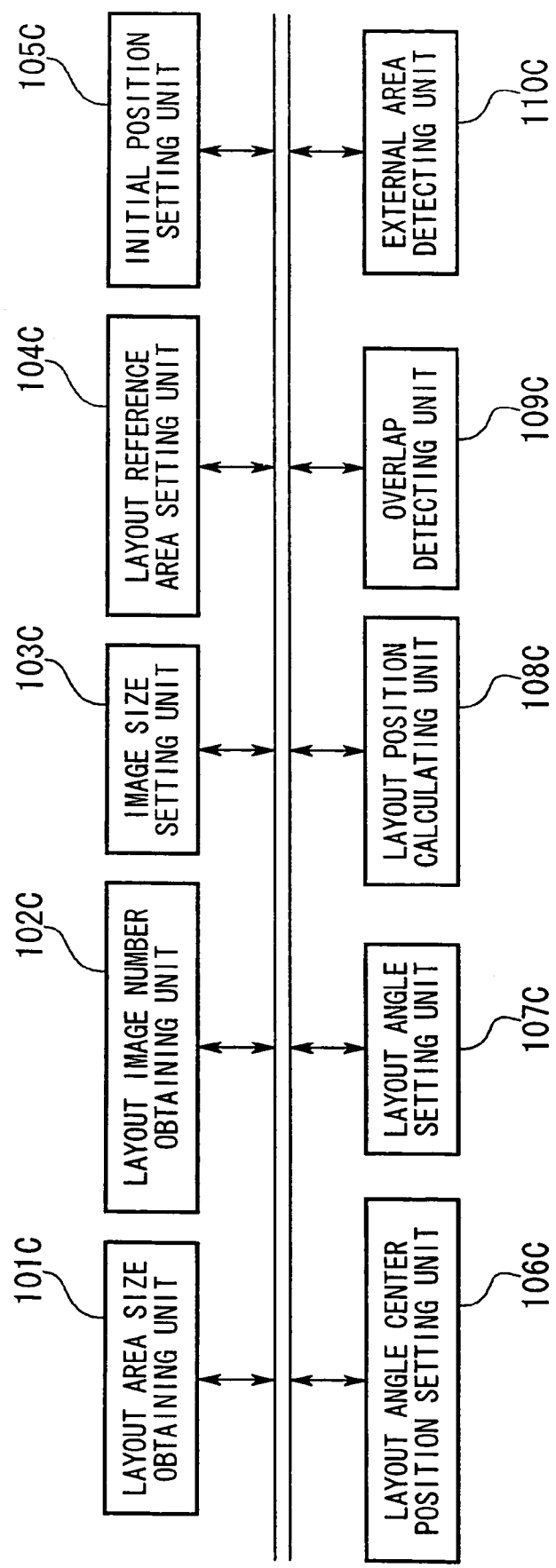
FIG. 15 is a block diagram showing an example of the structure of the image layout device of the invention.
Figure 16:
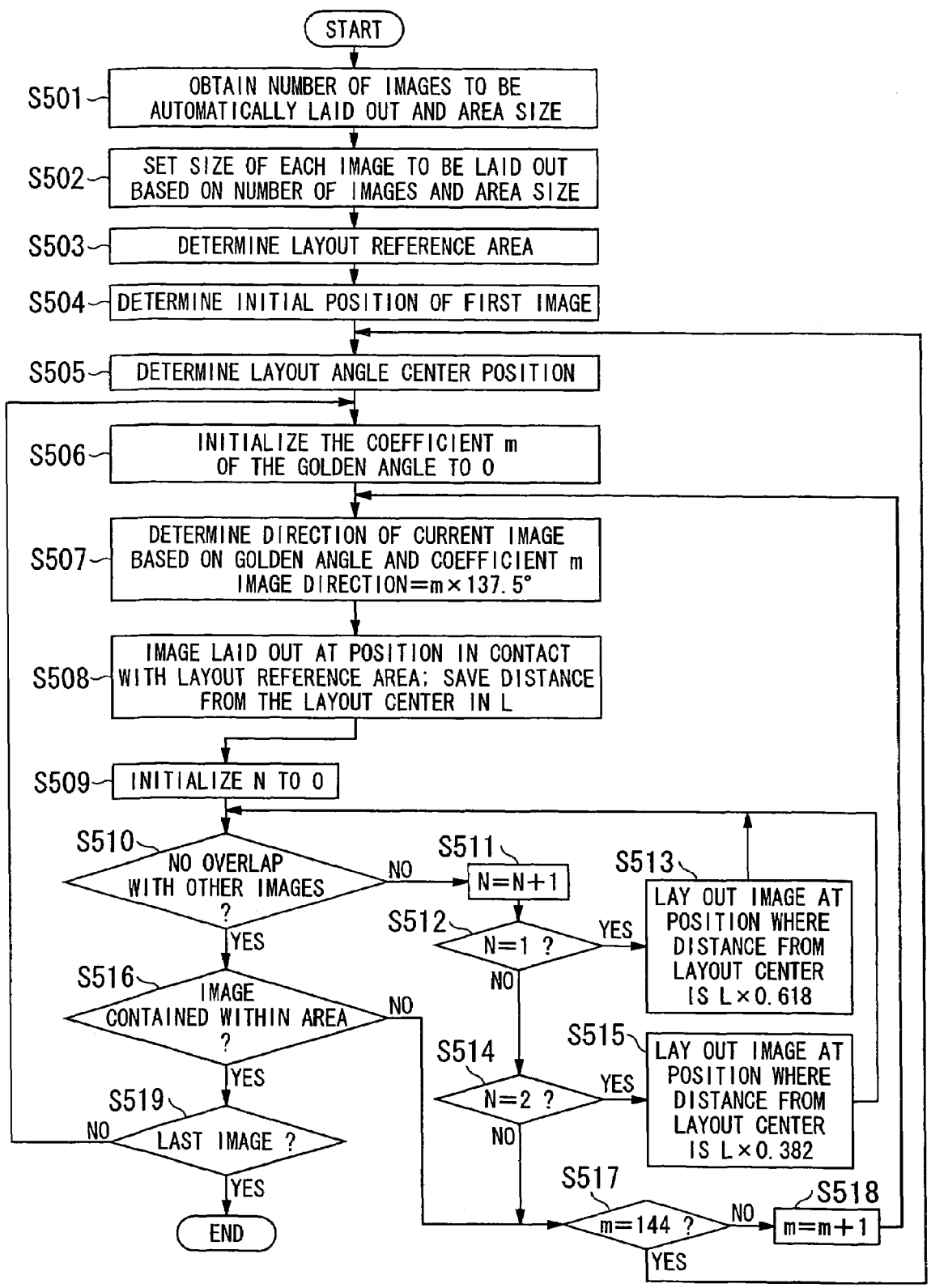
FIG. 16 is a flowchart showing an example of the operation of the structure in FIG. 15.

Below, a fourth embodiment of the present invention will be explained with reference to the figures. FIG. 15 is a block diagram for explaining the structure of the image layout device of the present invention, and FIG. 16 is a flowchart for explaining an example of the operation thereof. The image layout device of the present embodiment is structured by a general use computer that provides a central processing unit, a memory device, keyboard, mouse, display device, a memory device that uses a optical recording medium or the like; peripheral devices such as a printer, digital camera and the like; and a program for image layout processing that is executed on a predetermined system software by a computer. FIG. 15 shows each of the functions of the image layout processing program divided into blocks.

In FIG. 15 and FIG. 16, an image layout device (image layout program) that is started up due to an operation by the user (operator) obtains an area size for laying out the images that the user has indicated by using a graphical user interface or the like with the user by using a layout area size obtaining unit 101C. In addition, similarly, the layout image number obtaining unit 102C obtains the number of images that have been indicated by the user to be automatically laid out (step S 501 in FIG. 16).

The image size setting unit 103C sets the change ratio (reduction ratio or the enlargement ratio) of the image size (width and height) when each of the images is laid out based on the obtained number of images and the area size. At this time, the sizes of each of the images is set to several tens of percent (20% to 80%) of the value equaling the area size divided by the number of images (the largest size allotted to one image). Each of the images is laid out within a particular area (layout reference area) at the size that has been set by the image size setting unit 103C.

In addition, in the case that the sizes of each of the images are different, the image size setting unit 103C calculates the size of each of the laid out images, divides this calculated value by the area size, and finds the change ratio of the image size such that the result of this division becomes the same several tens of percent. The reduction ratio and enlargement ratio is the same for all images, that is, the change in the size is carried out uniformly.

The layout reference area revising unit 104C sets the layout reference area that serves as the reference by which the images are actually laid out based on the area size obtained by the layout area size obtaining unit 110C (step S 503). For the method of deciding this layout reference area, setting the reference area to 95% of the area size, or the setting the reference area by subtracting a predetermined value, for example, 5% of the area size, from the width and height of the area size can be considered. In the present embodiment, each of the images is laid out in this layout reference area.

The initial position setting unit 105C determines the initial position (X0, Y0) of the image that is first laid out (step S 504). For the method of determining this initial position, obtaining the initial position by generation using random numbers, setting at the center of the area, setting by a user action, or from pre-defined definition data can be considered. In addition, it is necessary to consider the case in the case that an image is laid out with respect to the initial position, the case in which the center of the image is aligned with the initial position, the case in which the center of gravity of the image is aligned with the initial position, and the case in which the center of an circumscribed rectangle of the image is aligned with the initial position. The layout area center position setting unit 106C determines the position of the center position (reference point) of the layout angle (step S 505). In this method of determining this layout angle center position, the center position can be set at an arbitrary point within the layout area irrespective of the initial position of the image that is laid out first. For example, a method in which the center point of nine rectangles created when the abscissa and ordinate of the layout area are segmented into three parts serves as the layout angle center position can be considered.

The layout angle revising unit 107C initializes the coefficient m (where m is an integer equal to or greater than 0) of the golden angle (step S 506). The golden angle denotes the angle in which the circumference 360° is divided by $1:(1+\sqrt{5})/2$, and is found to be $360°/(1+(1+\sqrt{5})/2) = 137.507764$. This golden ratio is known to express the aesthetically pleasing rectangular aspect ratio having the greatest balance. The golden angle is known, for example, in the arrangement of the leaves, where the overlap between leaves is made small by leaves sprouting from branches at the golden angle, making it possible to optimally distribute the sunlight and rain. In the present embodiment, the layout angle for each image is determined based on an angle that is m times (an integer multiple) the golden angle, and the layout position for each of the images is determined depending on the overlap between each of the images using this determined angle. The layout angle setting unit 107C determines the direction θ (layout angle θ) that the image being laid out should be laid out based on the golden angle and the coefficient m by using the calculation θ=m×golden angle (step S 507).

For example, for the angle of the layout position, when the position of the line segment that extends from the center of the image that has been laid out at the initial position in the horizontal direction is set to 0°, the direction θ is calculated in the clockwise direction using this as a reference, and the image is laid out on the axis having the slope of this θ.

In addition, it is also possible to set the slope using the golden angle when each of the images is laid out. At this time, when the slope has attained a set threshold angle, control can be carried out so that the slope inclines in the opposite direction.

Note that in the present embodiment, as a concrete value for the golden angle, the range of values from 130° to 144° is used. However, the most preferable example of the value of the golden angle is approximately 137.5°, which is calculated based on the Fibonacci number series.

The initial position calculating unit 108C lays out the image in the direction determined by the layout angle setting unit 107C and at the position (X, Y) at which the external edge of the image contacts the layout reference area, and the distance between the images is stored in L (a variable) (step S 508). In addition, the variable N is initialized to 0 (step S 509).

The overlap detecting unit 109C compares the initial position (X, Y) found by the initial position calculating unit 108C and the position of the other images calculated up to this point in time, and determines whether or not any of the images are overlapping (step S 510). In the case that the overlap determining unit 109C determines that there is overlapping (NO in step S 510), the variable N is incremented by 1 (step S 511), and the initial position calculating unit 108C carries out the calculation of the new initial position again. Here, when the variable N is 1 (YES in step S 512), in the value of the distance L between the images stored in step S 508, the value raised by the golden section point 0.618 found by using the golden ratio $1:(1+\sqrt{5})/2$ is set as a new image distance, the image is laid out (step S 513), and the processing returns to step S 510, where it is determined whether or not the image overlaps with other images.

In contrast, in the case that the variable N is 2 (YES in step S 514 from NO in step S 512), in the value of the distance L between images stored in step S 508, the value raised by one more golden section point 0.382 (L×0.382) found by the golden ratio 1:(1+√5)/2) is set to the new image distance, the image is laid out (step S 513), the processing returns to step S 510, where it is determined whether or not the image overlaps with other images.

When the overlap detecting unit 109C has determined that there is no overlap with other images (YES in step S 510), the external area detecting unit 110C determines whether or not the image is inside the layout reference area determined by the layout reference area setting unit 104C (step S 518). In the case that the external area detection unit 110C has determined that the image is protruding, even in the case that the overlap detecting unit 109 has determined that the image does not overlap other images, the calculation is performed again by the layout angle setting unit 107C, the initial position calculating unit 108C, and the like (step S 117 from NO in step S 516, step S 507 vial step S 518). For example, the layout angle setting unit 107C increases the coefficient m of the golden angle by 1 (step S 518), and for the new golden angle, identical calculations are carried out by the layout angle setting unit 107, the initial position calculating unit 108C, and the like (steps S 508 to S 515). At this time, when n exceeds 144 (NO in step S 517), that is, because the processing has returned to an angle of m=0, the processing returns to step S 505, the position of the center point of the new layout angle is determined, and identical calculations are carried out. Here, the processing in steps S 517 to 518 functions as the layout angle revising device, and is carried out in the block shown in FIG. 15 that includes the layout angle setting unit 107C, the external area detecting unit 110C, and the like, or the processing is carried out in other functional blocks (not illustrated).

Here, the processing in step S 517 will be explained. In the case, for example, that the set value of the golden angle is 137.5°, the layout angle θ when the direction has been changed 144 times is θ=m×137.5=144×137.5°=360°×55, and this is equivalent to the layout angle θ=0 when m=0. That is, even if the coefficient m is changed up to m=144 or greater, the calculation is repeated for a direction identical to already completed calculations. Thus, in step S 517, by determining whether or not the coefficient m equals 144, it is possible to determine whether or not there are still directions for which the initial position has not been calculated at the same layout angle center position. In addition, in the case that there are directions for which center positions have not been calculated, the layout angle θ is set in another direction, and layout processing of the image is carried out.

In addition, in the case that the variable N is equal to or greater than 3 (NO in step S 514), processing is carried out that is identical to the case in which the external area detecting unit 110 has determined that the image is protruding.

In the case that the overlap detecting unit 109C has determined that there is no overlap and the external area detecting unit 110C has determined that there is no protrusion outside the layout reference area (YES in step S 510 and YES in step S 516), the layout position of the image is set at the position calculated by the initial position calculating unit 108C in steps S 508, S 513, and S 515. In the initial position setting unit 105C and the like, it is confirmed whether or not there are still images whose layout position is to be calculated, and in the case that unprocessed images remain, the layout calculation is continued (step S 506 from NO in step S 519). In contrast, in the case that the processing for all of the images has been completed, the processing ends (YES in step S 519).

Figure 17:
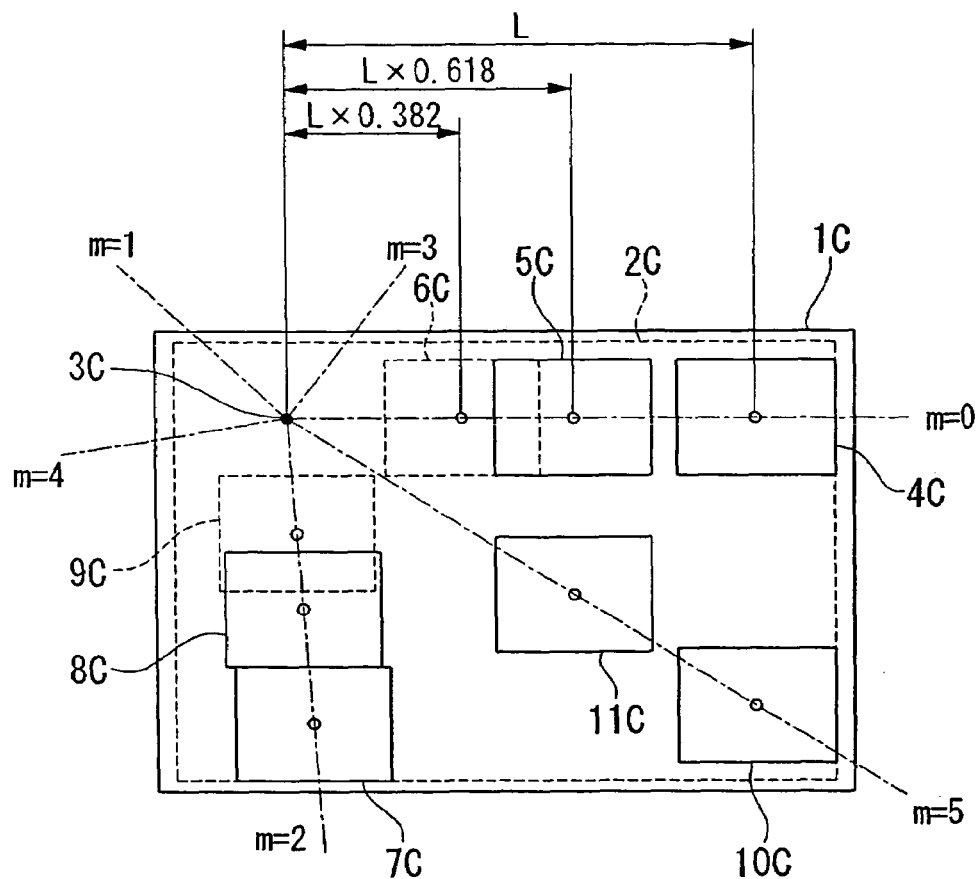
FIG. 17 is a drawing showing an example of image layout using the structure and flowchart in FIG. 15 and FIG. 16.
Figure 18:
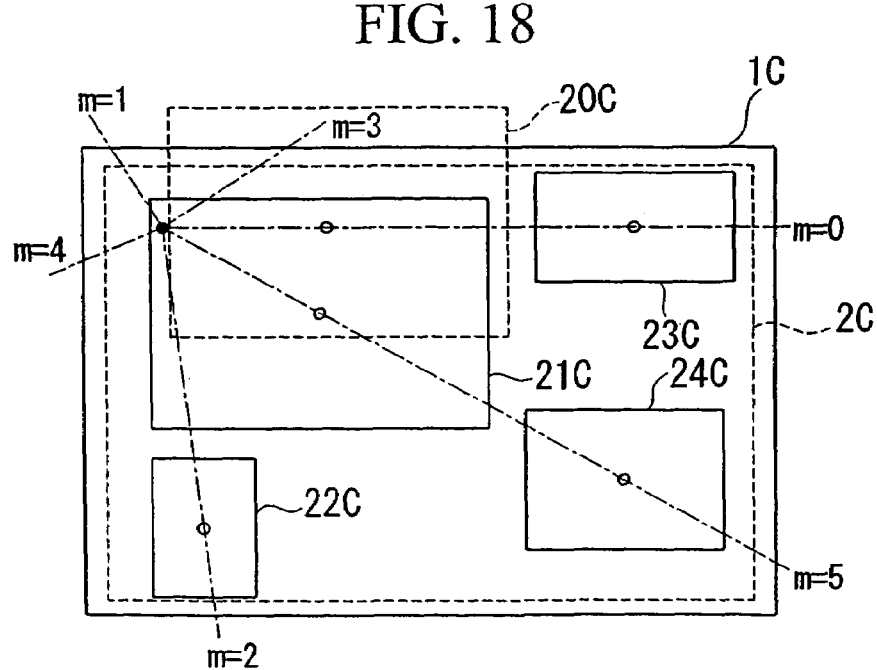
FIG. 18 is a drawing showing an example of image layout using the structure and flowchart in FIG. 15 and FIG. 16.

FIG. 17 shows an example of the case in which six images 4C, 5C, 7C, 8C, 10C, and 11C are laid out in the layout reference area in the particular area 1. In this example, the layout angle center position 3C serves as a reference point, and the first image 4C is laid out at a position in contact with the reference layout area 2 at angle θ° (m=0). Images 5C, 7C, 8C, 10C, and 11C show the second to sixth images to be laid out. The coefficients of the golden angle are denoted by m=0 to m=5, and each of the reference numbers are displayed in proximity to the broken line indicating the direction of the extension of the golden angle that has been multiplied by m. In this example, the second image 5C is also laid out in the direction of the golden angle having m=0. The second image 5C is laid out at the position (the position L×0.618 from the layout angle center position 3C) set by segmenting a line (distance L) intersecting the layout angle center position 3C from the layout center of the first image 4C by the golden ratio. In addition, the third and fourth images 7C and 8C cannot be laid out at the angle having m=1, and thus they are laid out at an angle having m=2 (layout angle θ=275°). In addition, the fifth and sixth images 10C and 11C cannot be laid out at an angle having m=3 or 4, and thus they are laid out at an angle having m=5.

Note that at the angle having m=0 and 2, other images overlap at the position from the layout angle center position 3C having L×0.382 (areas 6C and 9C shown by the broken lines), and thus images are not laid out there.

In FIG. 17, images having identical size and slope are shown, but as has already been explained, because the change ratio by which the size of the image to be laid out is changed is found by the size of the reference layout area, the number of images to be laid out, and the size of each of the images and then the size of each of the images is adjusted, as shown in FIG. 8, a balanced layout in a predetermined reference layout area is possible when four images having different sizes are laid out.

Similar to FIG. 17, there is no space at the angles having m=1, 3, and 5, and thus images are not laid out there. In addition, image 20C cannot be laid out at an angle having m=0 or 2 due to its size, and thus it is laid out as image 21C at an angle having m=5. In addition, due to overlapping with image 21C, image 22C is laid out at the position at L×0.618 on the straight line of the angle having m=2, and image 23C is laid out at a position having L on a straight line of the angle having m=0.

In the present invention, the regular beauty that appears in the natural world is provided rules, and the natural beauty to which human have become accustomed over the ages can be recreated. Thus, even when applied to an electronic photograph album, people can recreate a beautiful layout that feels natural.

In addition, repeated calculation is almost completely unnecessary, and if the layout direction is determined, the position that can be taken by images can be immediately determined. Thus, even in a device having a small memory capacity or a low CPU power, there is the advantage that the layout calculation can be carried out easily.

Note that in the embodiments described above, in steps S 513 and S 515 in FIG. 16, a golden section point was used, but it is possible to simply use ⅔, ⅓ or the like.

In addition, the layout position in the embodiment described above can be controlled by being set at a position segmented by a value found by setting the straight line determined from the center position of the layout angle and the boundary of a particular area or a layout reference area that is set to 0 (the case in which the image is laid out at the center position of the layout angle) or 1 (the case in which the image is laid out at a position in contact with the border) or substantially at the golden ratio. However, the segment points on the straight line can consist of 1 (the case in which, for example, only the point consisting of the position having L×0.382) to a plurality of 3 or more points.

In addition, the embodiment of the present invention can be realized by a computer and a program that is executable on this computer, and this program can be distributed via a telecommunication line or a computer readable medium. In addition, each of the units shown in FIG. 15 can be further divided or combined, or can be divided and distributed via a telecommunication line.

Note that the present invention was explained based on the golden angle, but the configuration of the present invention can also have the following characteristics. Specifically, the present invention can be understood to be one that automatically determines the layout of one or a plurality of images within a particular area (or a layout reference area that is set based on a particular area), and determined the layout of images by using the Fibonacci number series. Here, when using the Fibonacci number series, the present invention can be understood to be one in which the layout of the images is determined by applying the Fibonacci number series to angles. Or, when using the Fibonacci number series, the present invention may be characterized in determining the position of images by applying the Fibonacci number series to a distance. Or, although not described in particular in the embodiment described above, when using a Fibonacci number series, it is also possible to determine the position of an image by applying the Fibonacci number series to the direction (slope) of the image. Or, when using a Fibonacci number series, it is also possible to characterize the present invention in determining the position of an image by applying an isometric spiral (a spiral in which the straight line that connects a vertex and an arbitrary point on the curve always has the same angle as the tangent to the curve on this point) in which a Fibonacci number series appears.

As described above, in the image layout device of the present invention, the golden angle is 130° to 144°. Thus, in the case that the number of images is small, by approximating the golden angle to a rational number, it is possible to simplify further the calculation processing.

In the image layout device of the present invention, in addition, the layout angle revising device (the layout angle revising unit 107B) has increased the value that is an integer multiple of a predetermined angle used as the reference for the image whose layout position has been determined, then the layout angle determining device (the layout angle setting unit 107C) determines the layout angle for each of the images again, and the layout position determining device (the image position calculating unit 106C) determines the layout position of images at a position where there is no contact with images in the layout reference area determined by the layout reference area determining device (the layout reference area setting unit 104C). As a result, in the image layout device of the present invention, because the layout position of an image is set at a position at which the image contacts the layout reference area after a predetermined integer multiple of an angle is increased by a predetermined amount and the layout angle for each of the images is determined again (that is, because the images are laid out at the periphery of the layout reference area), it is possible to increase the probability that the images can be laid out without overlapping, and in addition, the tendency that laying out images in proximity to the border of the layout reference area (or a particular area) is easier than at the periphery of the center position that serves as the reference for the layout angle.

In addition, in the image layout device of the present invention, after the layout angle revising device increases by a predetermined amount the value which is an integer multiple of a predetermined angle used as the reference for images whose layout position has been determined, the layout angle for each of the images is determined again by the layout angle determining device, and the layout position determining device sets the layout position of the image at a position at which the straight line that connects the position in contact with the image and the center position of the layout angle has been segmented by the golden ratio in the layout reference area determined by the layout reference area determining device.

In addition, in the image layout device of the present invention, an image size setting unit that sets the image size when each of the images is laid out based on the number of electronic images to be laid out and the size of the particular area, and this layout position determining device determines the layout position for each of the images at the position at which the straight line determined by center position of the layout angle and the boundary with the particular area or the layout reference area at a layout angle determined by the layout angle determining device at a size determined by the image size setting device (the image size setting unit 103C). Thereby, the image layout device of the present invention can more easily find the layout position at each for the layout angles.

In addition, in the image layout device of the present invention, the predetermined value is a value that can be found by 0, 1, or an approximate golden ratio. Thereby, the image layout device of the present invention can determine a layout position for each of the images by using the golden ratio by a simpler calculation processing.

In addition, the image layout method of the present invention is a method that automatically lays out a plurality of images within a particular area, and provides a layout angle determining step that sets the center position, which serves as the reference for the layout angle, and determines the angle of the layout position for each of the images based on the angle that is an integer multiple of the golden angle; a layout reference area determining step that, within a particular area, determines the layout reference area in which the images can be laid out; a layout position determining step in which the layout position for each of the images is determined depending on the overlap between each of the images due to the angle determined in the layout angle determining step and the layout reference area which has been determined by the layout reference area determining step; and a layout angle revision step that revises the value that is an integer multiple of a predetermined angle that serves as a reference in the layout angle determining process when there are images whose layout position has not been determined by the layout position determining step.

In addition, a program for the present invention includes descriptions for execution by using a computer of a layout angle determining step that sets the center position, which serves as the reference for the layout angle, and determines the angle of the layout position for each of the images based on the angle that is an integer multiple of the golden angle; a layout reference area determining step that, within a particular area, determines the layout reference area in which the images can be laid out; a layout position determining step in which the layout position for each of the images is determined depending on the overlap between each of the images due to the angle determined in the layout angle determining step and the layout reference area which has been determined by the layout reference area determining step; and a layout angle revision step that revises the value that is an integer multiple of a predetermined angle that serves as a reference in the layout angle determining process when there are images whose layout position has not been determined by the layout position determining step.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image layout device that automatically lays out a plurality of electronic images within a particular area, comprising:
    a layout angle determining device that determines a layout angle of 130° to 144° for each of the images based on an angle that is an integer multiple of a golden angle found by $360°/(1+(1+\sqrt{5})/2)$ serving as the golden angle; and
    a layout position determining device that determines a layout position for each of the images depending on an overlap between each of the images due to the layout angle determined by the layout angle determining device based on an angle that is an integer multiple thereof.

2. The image layout device according to claim 1,
    among the plurality of images, an initial position, which is the layout position of the image that is laid out first, being determined depending on any one of a position found using a random number, a center position of a particular area, a position set depending on an operation of an operator, or a position set based on definition data set in advance.

3. The image layout device according to claim 2, a layout angle determining device determining the layout angle in a direction of an angle that is m times the golden angle, which is an mth (where m is an integer equal to or greater than 0) golden angle, when determining the position of an nth (where n is an integer equal to or greater than 2) image; and
    a layout position determining device setting as the layout position of the nth image a position at which there is no overlap with other images while offsetting a distance from the initial position a predetermined amount each time.

4. The image layout device according to claim 3,
    the predetermined amount used when offsetting the distance is one pixel or a predetermined plurality of pixels, where a pixel serves as the unit.

5. The image layout device according to claim 3,
    the predetermined amount used when offsetting the distance being determined by using two or more numbers in a Fibonacci number series.

6. The image layout device according to claim 3,
    the predetermined amount used when offsetting the distance being determined so as to increase according to a Fibonacci number series.

7. The image layout device according to claim 3,
    when determining the position of the nth image, in the case that the image protrudes from a particular area at the layout position where the image overlaps with another image by increasing the distance from the initial position on an extension of the mth golden angle, or the case in which the image overlaps another image even when the distance is increased to a predetermined amount or more, the position of the image is found by increasing the distance from the initial position again on the extension along an m+1 golden angle.

8. The image layout device according to claim 3
    when finding the position of an n+1 image, the layout position being determined first based on the extension of the n+1 golden angle, which corresponds to the golden angle following the mth golden angle used to find the position of the nth image.

9. The image layout device according to claim 3,
    when finding the position of the n+1 image, the layout position being determined first based on an extension of the 0th golden angle, irrespective of a number of the golden angle used to find the position of the nth image.

10. The image layout device according to claim 2, the layout angle determining device determining the layout angle in a direction of an angle that is m times the golden angle, which is an mth (where m is an integer equal to or greater than 0) golden angle, when determining the position of an nth (where n is an integer equal to or greater than 2) image; and
    a layout position determining device setting as the layout position of the nth image a position at which there is no overlap with other images and the images are separated by a constant distance while offsetting a distance from the initial position a predetermined amount each time.

11. The image layout device according to claim 10,
    the predetermined amount used when offsetting the distance being one pixel or a predetermined plurality of pixels, where a pixel serves as the unit.

12. The image layout device according to claim 10,
    the predetermined amount used when offsetting the distance being determined by using two or more numbers in a Fibonacci number series.

13. The image layout device according to claim 10,
    the predetermined amount used when offsetting the distance is determined so as to increase according to a Fibonacci number series.

14. The image layout device according to claim 10
    when determining the position of the nth image, in the case that the image protrudes from a particular area at the layout position where the image overlaps with another image by increasing the distance from the initial position on an extension of the mth golden angle, or the case in which the image overlaps another image even when the distance is increased to a predetermined amount or more, the position of the image is found by increasing the distance from the initial position again on the extension along an m+1 golden angle.

15. The image layout device according to claim 10,
    when finding the position of the n+1 image, the layout position being determined first based on an extension of the n+1 golden angle, which corresponds to the golden angle following the mth golden angle used to find the position of the nth image.

16. The image layout device according to claim 10,
    when finding the position of an n+1 image, the layout position being determined first based on the extension of the 0th golden angle, irrespective of a number of the golden angle used to find the position of the nth image.

17. The image layout device according to claim 2,
    in the case that the position of one or more images cannot be determined as a result of calculating the position of all images, the initial position being recalculated by being offset by one pixel or a plurality of pixels.

18. The image layout device according to claim 1, the layout position determining device determining the layout position for each of the angles such that the overlap between each of the images due to the angle determined by the layout angle determining device is eliminated or falls within a permitted range set in advance.

19. An image layout method that automatically lays out a plurality of electronic images within a predetermined area, comprising:

determining a layout angle for each of the images based on an angle of 130° to 144° that is an integer multiple of a golden angle found by 360°/(1+(1+$\sqrt{5}$)/2) serving as the golden angle; and determining a layout position for each of the images depending on an overlapping of each of the images due to the layout angle for each of the images based on an angle that is an integer multiple thereof.

20. The image layout device according to claim 19, the center position of the layout angle being revised by the layout angle center position determining device in the case that the layout angle determined by the layout angle determining device is identical or substantially identical to the layout angle determined previously for the image.

21. The image layout device according to claim 19, the layout angle center position determining device using any of lattice points created when segmenting the area into a lattice shape as the layout angle center position.

22. An image layout device according to claim 19, the layout angle center position determining device using an arbitrary point outside the area as the layout angle center position.

23. A computer readable medium having computer readable instructions stored thereupon, which when executed cause automatic layout of a plurality of electronic images in a predetermined area and that instructs a computer to execute:

determining a layout angle for each of the images based on an angle of 130° to 144° that is an integer multiple of a golden angle found by 360°/(1+(1+$\sqrt{5}$)/2) serving as the golden angle; and determining the layout position for each of the images depending on an overlapping of each of the images due to the layout angle for each of the images based on an angle that is an integer multiple thereof.

24. An image layout device that automatically lays out a plurality of electronic images within a particular area, comprising:

a layout angle center position determining device that sets a center position of the layout angle at an arbitrary position within an area;

a layout angle determining device that determines a layout angle of 130° to 144° for each of the images based on an angle that is an integer multiple of a golden angle found by 360°/(1+(1+$\sqrt{5}$)/2) serving as the golden angle, where a layout angle center position determined by the layout angle center position determining device serves as a reference; and a layout position determining device that determines the layout position for each of the images depending on the overlap between each of the images due to the layout angle determined by the layout angle determining device for each of the images based on an angle that is an integer multiple thereof.

25. An image layout method that automatically lays out a plurality of electronic images within a particular area, comprising:

determining the center position of a layout angle at an arbitrary position within an area;

determining the layout angle of 130° to 144° for each of the images based on a predetermined angle, where the layout angle center position determined by the layout angle center position is based on an angle that is an integer multiple of the predetermined angle found by 360°/(1+(1+$\sqrt{5}$)/2) serving as the predetermined angle, the layout angle center position determining step is used as a reference; and determining a layout position for each of the images depending on an overlap between each of the images due to the layout angle for each of the images based on an angle that is an integer multiple thereof.

26. A computer readable medium having computer readable instructions stored thereupon, which when executed cause a computer to execute:

determining a center position of the layout angle at an arbitrary position within an area;

determining a layout angle of 130° to 144° for each of the images based on a predetermined angle, where a layout angle center position determined by the layout angle center position is based on an angle that is an integer multiple of the predetermined angle found by 360°/(1+(1+$\sqrt{5}$)/2) serving as the predetermined angle, the layout angle center position determining step is used as a reference; and determining a layout position for each of the images depending on an overlap between each of the images due to the layout angle determined by the layout angle determining step for each of the images based on an angle that is an integer multiple thereof.

27. An image layout device that automatically lays out a plurality of electronic images within a particular area, comprising:

a layout angle determining device that determines a layout angle of 130° to 144° for each of the images based on an angle that is an integer multiple of a golden angle found by 360°/(1+(1+$\sqrt{5}$)/2) serving as the golden angle;

a layout position determining device that determines a layout position for each of the images depending on the overlap between each of the images due to the angle determined by the layout angle determining device for each of the images based on an angle that is an integer multiple thereof; and a layout angle revising device that revises a value of an integer multiple of a predetermined angle that the layout angle determining device uses as a reference in a case that there are images for which the layout position could not be determined within a particular area by the layout position determining device.

28. The image layout device according to claim 27, the layout angle for each of the images being determined by using an initial position at which a first image has been laid out as a center position of rotation.

29. The image layout device according to claim 27, the layout angle revising device determining again the layout angle for each of the images by the layout angle determining device after the value of the integer multiple of a predetermined angle that serves as a reference for the image determined by the layout position is increased by a predetermined amount; and the layout position determining device setting the layout position for each of the images at a position where there is no overlap while offsetting the images by a predetermined amount each time.

30. The image layout device according to claim 27, the layout angle determining device determining again the layout angle for each of the images by the layout angle determining device after the value of the integer multiple of a predetermined angle that serves as a reference for the image determined by the layout position is increased by a predetermined amount; and the layout position determining device setting the layout position for each of the images at a position where there is no overlap and the images are separated by a distance having a value equal to or greater than a constant while offsetting the images by a predetermined amount each time.

31. An image layout method that automatically lays out a plurality of electronic images within a particular area, comprising:

determining a layout angle of 130° to 144° for each of the images based on an angle that is an integer multiple of a predetermined angle found by $360°/(1+(1+\sqrt{5})/2)$ serving as the predetermined angle;

determining a layout position for each of the images depending on an overlap between each of the images due to the layout angle for each of the images based on an angle that is an integer multiple thereof determined by the layout angle determining step; and revising a value of the integer multiple of a predetermined angle that serves as a reference in the layout angle determining step in a case that there are images whose layout position within a particular area could not be determined by the layout position determining step.

32. The image layout device according to claim 31 the layout angle revising device determines again the layout angle for each of the images by the layout angle determining device after increasing the value of the integer multiple of a predetermined angle that was used as a reference for the image whose layout position has been determined by a predetermined amount; and the layout position determining device determines the layout position for each of the images at a position that the images contacts for the layout reference area determined by the layout reference area determining device.

33. The image layout device according to claim 32, the predetermined value being 0 or 1 or a value found by using an approximate golden ratio.

34. The image layout device according to claim 31, the layout angle revising device determines again the layout angle for each of the images by the layout angle determining device after increasing the value of the integer multiple of a predetermined angle that was used as the reference for an image whose layout position has been determined by a predetermined amount; and the layout position determining device determines the layout position for the image at a position where a straight line connecting a position in contact with the image and the center position of the layout angle is segmented by the golden ratio for the layout reference area determined by the layout reference area determining device.

35. The image layout device according to claim 31, further including:

an image size setting unit that sets the image size when each of the images is laid out based on the number of electronic images to be laid out and a size of the particular area; and the layout position determining device determining the layout position for each of the images at a position at which a straight line is segmented by a predetermined value determined based on the center position of the layout angle and the border with a particular area or a layout reference area at an image size determined by the image size unit and at a layout angle determined by the layout angle determining device.

36. A computer readable medium having computer readable instructions stored thereupon, which when executed instructs a computer to execute:

determining a layout angle of 130° to 144° for each of the images based on an angle that is an integer multiple of a particular angle found by $360°/(1+(1+\sqrt{5})/2)$ serving as the particular angle;

determining a layout position for each of the images depending on an overlap between each of the images due to the angle for each of the images based on an angle that is an integer multiple thereof determined by the layout angle determining step; and revising a value of the integer multiple of a predetermined angle that serves as a reference in the layout angle determining step in a case that there are images whose layout position within a particular area could not be determined in the layout position determining step.

37. An image layout device that automatically lays out a plurality of electronic images within a particular area, comprising:

a layout angle determining device that sets a center position that serves as a reference for a layout angle of 130° to 144° and that determines a angle of a layout position for each of the images based on an angle that is an integer multiple of a golden angle found by $360°/(1+(1+\sqrt{5})/2)$ serving as the golden angle;

a layout reference area determining device that determines the layout reference areas in which images can be arranged within a particular area;

a layout position determining device that determines a layout position for each of the images based on an angle that is an integer multiple thereof depending on an overlap between each of the images due to the angle determined by the layout angle determining device and the layout reference area determined by the layout reference area determining device; and a layout angle revising device that revises a value of an integer multiple of a predetermined angle that the layout angle determining device uses as a reference in the case that there are images whose layout position could not be determined by the layout position determining device.

38. An image layout method that automatically lays out a plurality of images within a particular area, comprising:

setting a center position that serves as a reference for a layout angle of 130° to 144° and determining an angle of the layout position for each of the images based on an angle that is an integer multiple of a golden angle found by $360°/(1+(1+\sqrt{5})/2)$ serving as the golden angle;

determining the layout reference area in which images can be laid out within a particular area;

determining the layout position for each of the images depending on the overlap between each of the images based on an angle that is an integer multiple thereof due to the layout angle predetermined in the layout angle determining step and the layout reference area determined by the layout reference area determining step; and revising a value of an integer multiple of a predetermined angle that serves as a reference in the layout angle determining step in the case that there are images whose layout position could not be determined in the layout position determining step.

39. A computer readable medium having computer readable instructions stored thereupon, which when executed cause a computer to execute:

setting a center position that serves as a reference for a layout angle of 130° to 144° and determining the angle of the layout position for each of the angles based on an angle that is an integer multiple of a golden angle found by $360°/(1+(1+\sqrt{5})/2)$ serving as the golden angle;

determining a layout reference area in which images can be laid out within a particular area;

determining a layout position for each of the images depending on an overlap between each of the images based on an angle that is an integer multiple thereof due to the angle predetermined in the layout angle determining step and the layout reference area determined by the layout reference area determining step; and revising a value of the integer multiple of a predetermined angle that serves as a reference in the layout angle determining step in the case that there are images whose layout position could not be determined in the layout position determining step.

* * * * *